United States Patent
Huggenberger

(10) Patent No.: US 11,485,004 B2
(45) Date of Patent: Nov. 1, 2022

(54) HAND-HELD POWER TOOL

(71) Applicant: Festool GmbH, Wendlingen (DE)

(72) Inventor: Philipp Huggenberger, Munningen (DE)

(73) Assignee: FESTOOL GMBH, Wendlingen (DE)

( * ) Notice: Subject to any disclaimer, the term of this patent is extended or adjusted under 35 U.S.C. 154(b) by 289 days.

(21) Appl. No.: 16/642,212

(22) PCT Filed: Aug. 27, 2018

(86) PCT No.: PCT/EP2018/072958
§ 371 (c)(1),
(2) Date: Feb. 26, 2020

(87) PCT Pub. No.: WO2019/042907
PCT Pub. Date: Mar. 7, 2019

(65) Prior Publication Data
US 2020/0353609 A1 Nov. 12, 2020

(30) Foreign Application Priority Data
Aug. 29, 2017 (DE) .......................... 102017119807.5

(51) Int. Cl.
*B25F 5/00* (2006.01)
*F16H 3/64* (2006.01)
*B25F 5/02* (2006.01)

(52) U.S. Cl.
CPC ............... *B25F 5/001* (2013.01); *B25F 5/02* (2013.01); *F16H 3/64* (2013.01); *F16H 2200/2007* (2013.01); *F16H 2200/2035* (2013.01)

(58) Field of Classification Search
CPC ............... F16H 3/64; F16H 2200/2007; F16H 2200/2035
See application file for complete search history.

(56) References Cited

U.S. PATENT DOCUMENTS 9,233,461 B2    1/2016  Tomayko
2004/0211576 A1  10/2004  Milbourne et al.
(Continued)

FOREIGN PATENT DOCUMENTS

DE   102008056880      5/2010
DE   102008056880 A1   5/2010
(Continued)

*Primary Examiner* — Daniel Jeremy Leeds
(74) *Attorney, Agent, or Firm* — Hoffmann & Baron, LLP

(57) ABSTRACT

A manual machine tool having a drive motor, a gearbox arranged on a gearbox housing and a tool holder, wherein a motor drive of the drive motor with a gearbox drive of the gearbox and a gearbox output of the drive that is rotatable about an axis of rotation are coupled to the tool holder in a manner which permits rotation, wherein the gearbox can be switched between at least two switch positions in which the speed ratios between the gearbox drive and the gearbox output are different from one another, wherein the gearbox comprises a first wheel arrangement and at least a second wheel arrangement, each of which have at least one gear wheel and a switching gear element, wherein in both gear wheel arrangements the at least one gear wheel on the switching gear element and/or the switching gear element on at least one gear wheel can roll and the respective switching gear element is mounted in a locally adjustable manner to adjust the switch settings of the gearbox on the gearbox holding structure between the at least two setting positions and/or can be adjusted relative to the gearbox holding structure (44A) between an immobile position and a mobile position.

26 Claims, 6 Drawing Sheets

(56) References Cited

U.S. PATENT DOCUMENTS

| | | | |
|---|---|---|---|
| 2009/0129876 A1* | 5/2009 | Trautner | B23B 45/008 74/366 |
| 2010/0163261 A1 | 7/2010 | Tomayko et al. | |
| 2011/0152029 A1* | 6/2011 | Rudolph | B25B 21/02 475/331 |
| 2015/0122524 A1* | 5/2015 | Papp | B25B 21/00 173/20 |

FOREIGN PATENT DOCUMENTS

| | | |
|---|---|---|
| EP | 2316620 | 5/2011 |
| EP | 2316620 A2 | 5/2011 |
| EP | 2551063 | 1/2013 |
| EP | 2551063 A1 | 1/2013 |
| EP | 3147077 | 3/2017 |
| EP | 3147077 A1 | 3/2017 |

* cited by examiner

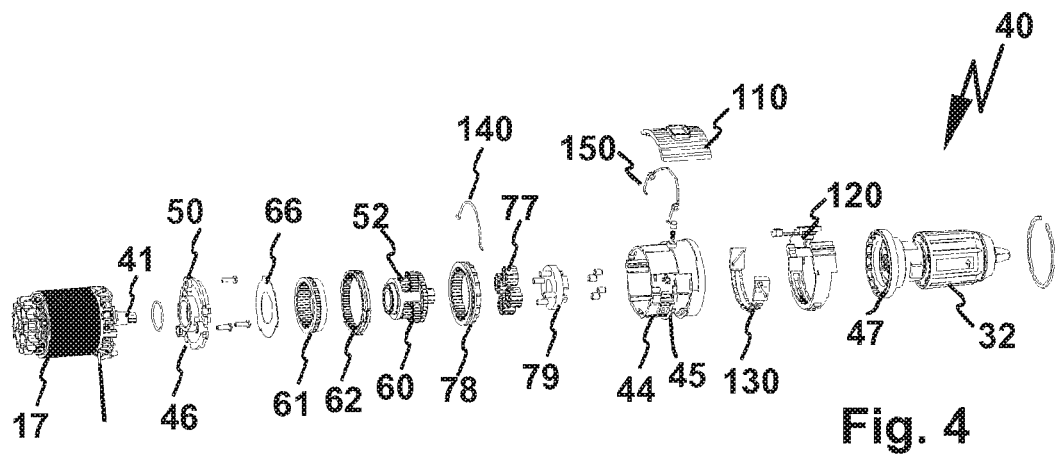
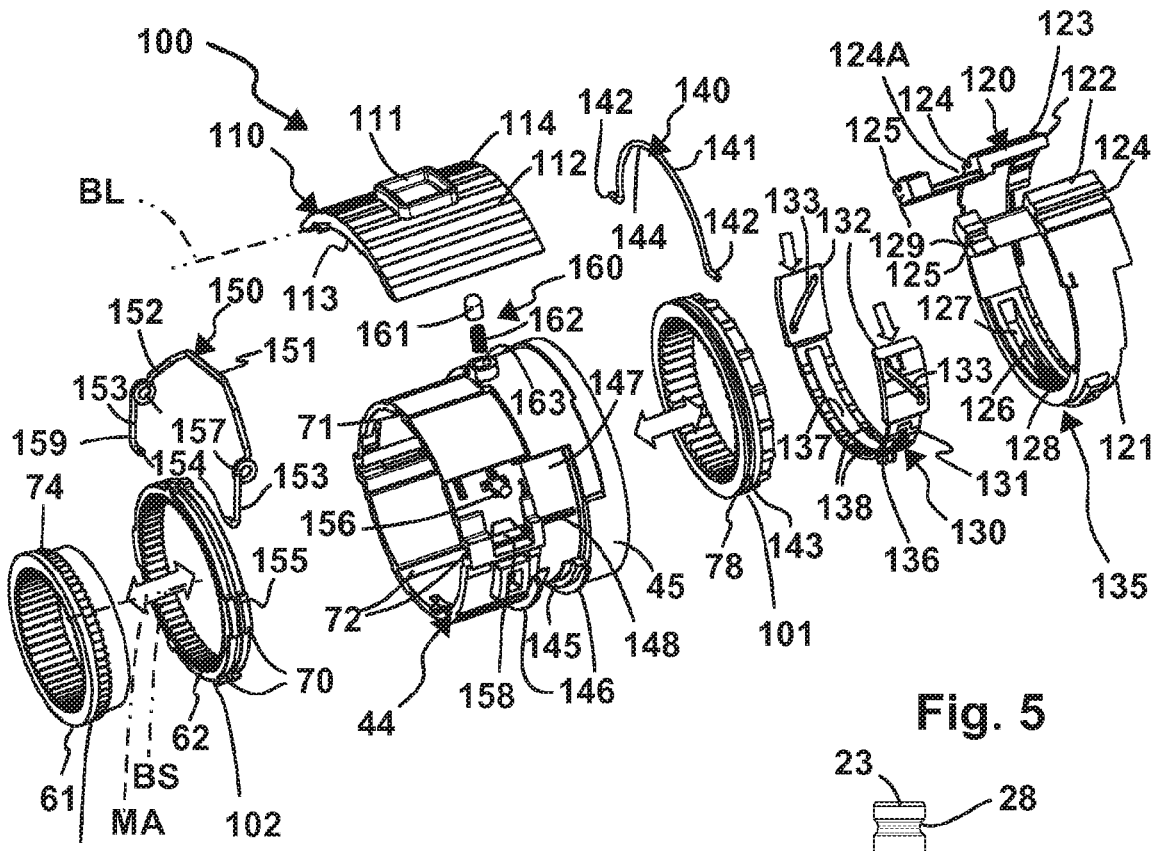
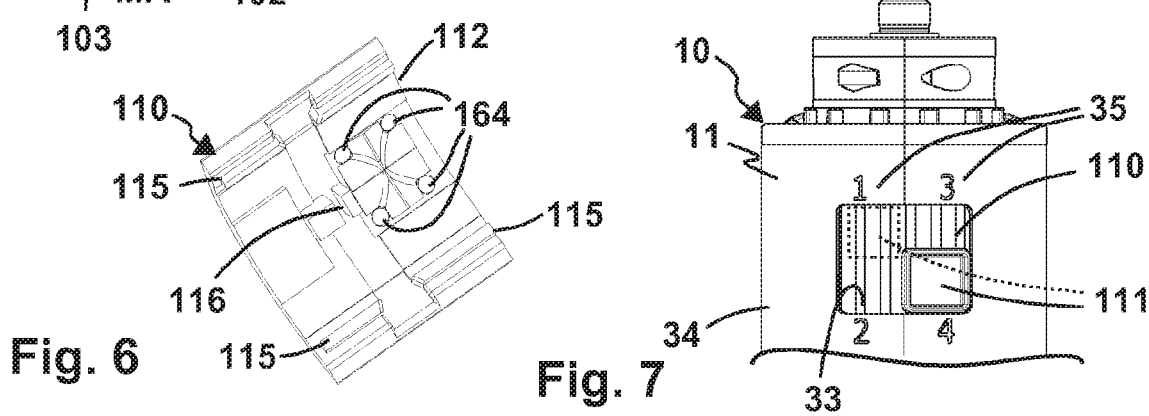

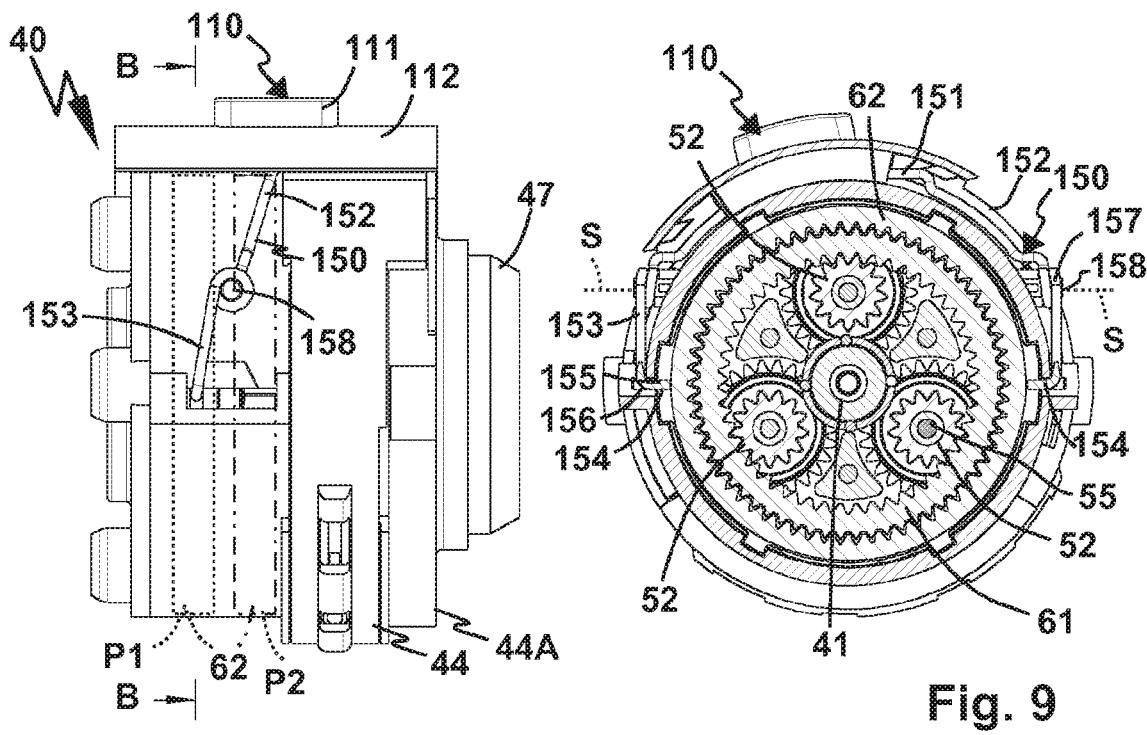
Fig. 8
Fig. 9
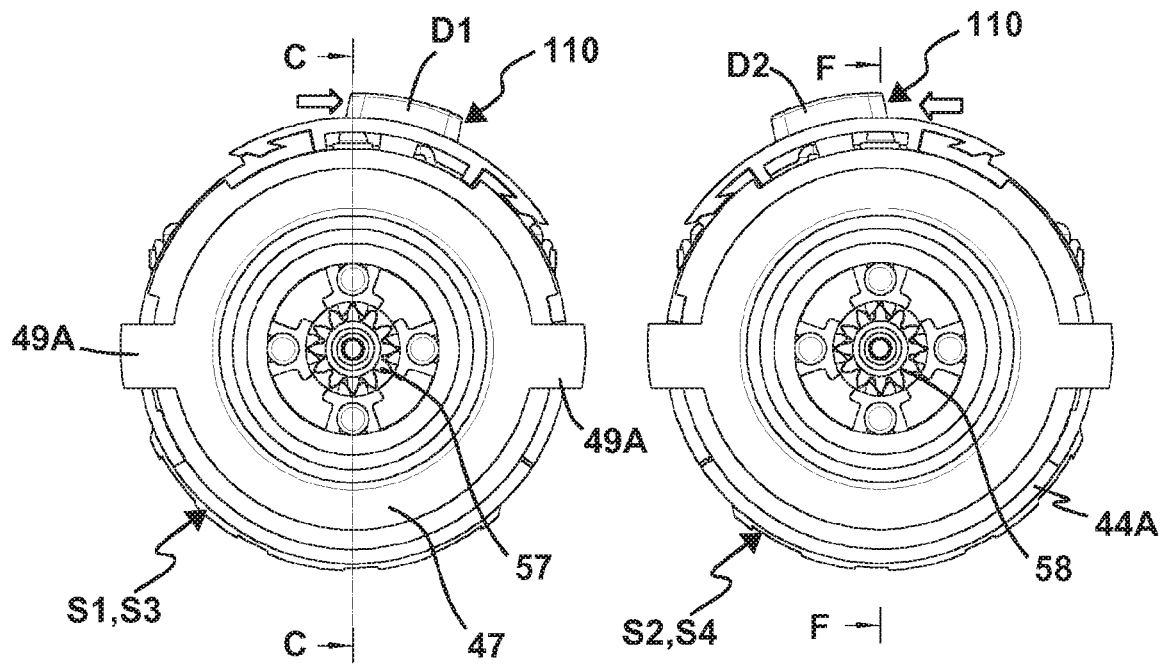
Fig. 10
Fig. 11

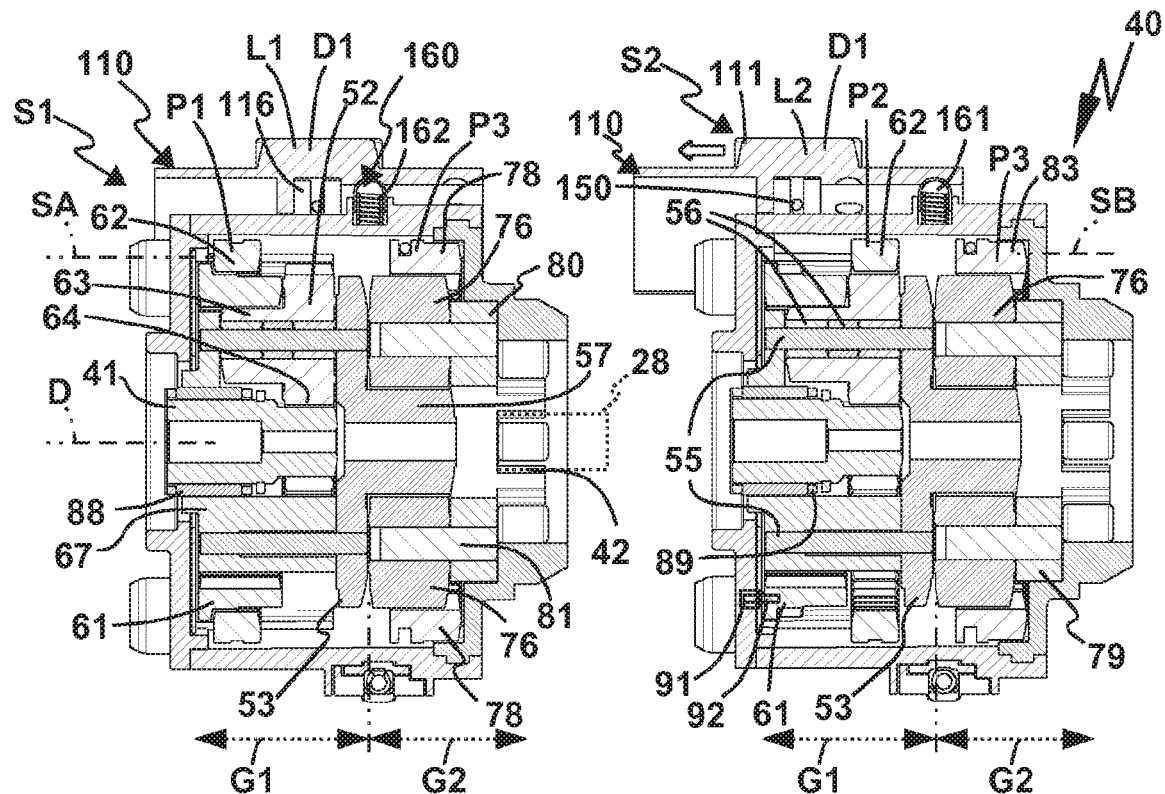
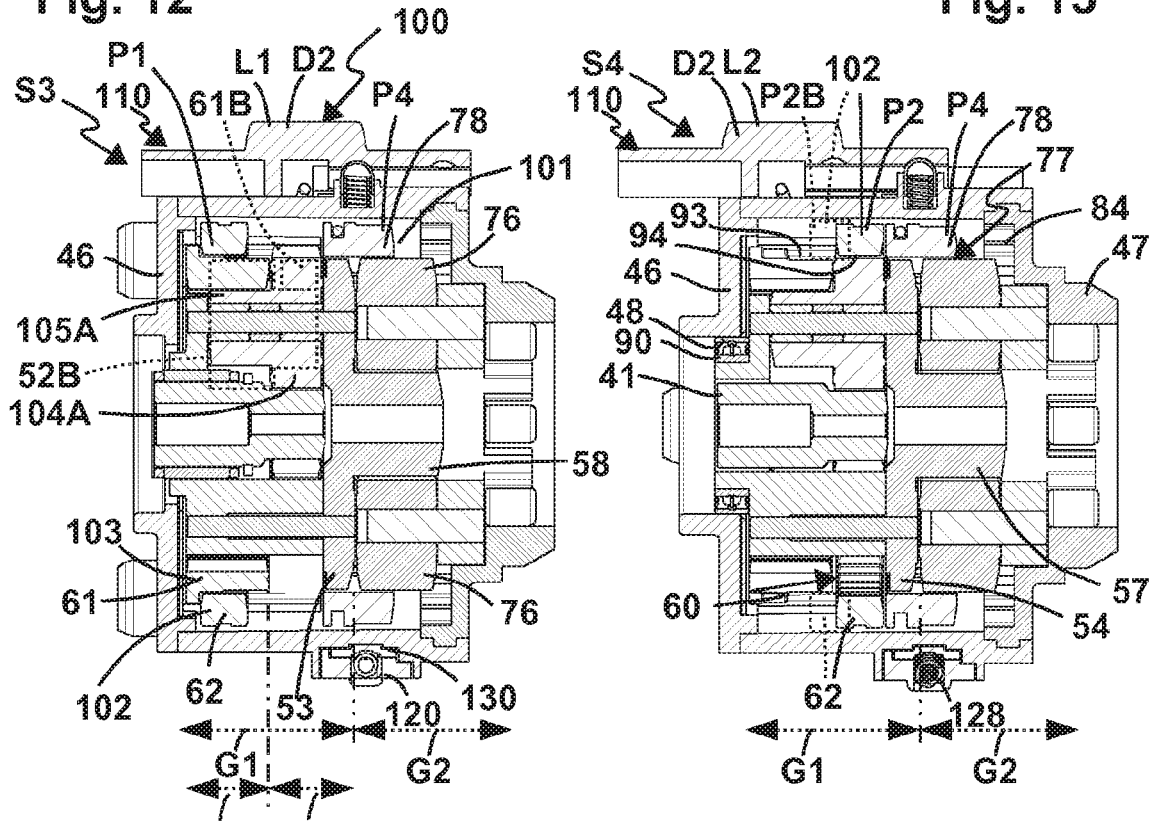

HAND-HELD POWER TOOL

This application claims priority based on an International Application filed under the Patent Cooperation Treaty, PCT/EP2018/072958, filed Aug. 27, 2018, which claims priority to DE 102017119807.5, filed Aug. 29, 2017.

BACKGROUND OF THE INVENTION

The invention relates to a manual machine tool having a drive motor, a gearbox arranged on a gearbox holding structure, in particular a gearbox housing and a tool holder, wherein a motor drive of the drive motor with a gearbox drive of the gearbox and a gearbox output of the drive that is rotatable about an axis of rotation are coupled in a manner which permits rotation to the tool holder, wherein the gearbox can be switched between at least two switch positions in which the speed ratios between the gearbox drive and the gearbox output are different from one another, wherein the gearbox comprises a first gear arrangement and at least a second gear arrangement, each of which have at least one gear wheel and a switching gear element, wherein in both gear wheel arrangements the at least one gear wheel on the switching gear element of the gear wheel arrangement and/or the switching gear element on at least one gear wheel of the gear wheel arrangement can roll and the respective switching gear element is mounted in a locally adjustable manner to adjust the switch settings of the gearbox on the gearbox holding structure between the at least two setting positions and/or can be adjusted relative to the gearbox holding structure between an immobile position and a mobile position.

A manual machine tool of this type is for example described in EP 1 886 769 A1. The manual machine tool has a four-speed gearbox with two hollow wheels as switching gear elements. Each hollow wheel or switching gear element can be switched by means of an actuating device in the manual machine tool, wherein both hollow wheels are adjusted in a linear manner in the gearbox housing. A complicated actuating device is needed for the individual actuation of the hollow wheels.

EP 2 551 063 B1 also discloses a manual machine tool having a four-speed gearbox. The four-speed gearbox can be switched by means of an actuating device that is rotatable and can be adjusted in a linear direction. A deflection gear is needed to deflect a rotational movement of the actuating device in a linear movement of a switching gear element. Both switching gear elements must be controlled individually by the actuating device.

SUMMARY OF THE INVENTION

The object of the present invention is therefore to provide a manual machine tool with an improved operating concept.

In order to achieve this object, in a manual machine tool of the type mentioned at the outset there is a provision for the switching gear element of the first gear wheel arrangement to form a switch actuator for the second gear wheel arrangement to switch the gearbox between at least two of the switch positions, which switch actuator can be switched between a first setting position and at least a second switch position in which a movement of the switching gear element of the second gear wheel arrangement is different relative to the gearbox holding structure and/or the switch actuator is disengaged and engaged with the at least one gear wheel of the second gear wheel arrangement.

In order to achieve the object, a manual tool machine having a drive motor, a gearbox and a tool holder is also provided, wherein a motor drive of the drive motor with a gearbox drive of the gearbox and a gearbox output of the drive that is rotatable about an axis of rotation are coupled in a manner which permits rotation to the tool holder, wherein the gearbox can be switched between at least two switch positions in which the speed ratios between the gearbox drive and the gearbox output are different from one another, wherein the gearbox comprises a first gear arrangement and at least a second gear arrangement, each of which have at least one gear wheel and a switching gear element, wherein in both gear wheel arrangements the at least one gear wheel on the switching gear element of the gear wheel arrangement and/or the switching gear element on at least one gear wheel of the gear wheel arrangement can roll, wherein the gear wheel arrangements are arranged on a gearbox holding structure that is locally fixed related to a machine housing of the manual tool machine, in particular a gearbox housing. In this manual machine tool, it is provided that the switching gear element of the first gear wheel arrangement forms a switch actuator for the switching gear element of the at least one second gear wheel arrangement in order to switch the gearbox between at least two switch positions, wherein the switch actuator can be switched between a first setting position and at least a second setting position, in which a movement of the other switching gear element relative to the gearbox holding structure is different.

The basic idea is for the switching gear element of the direst gear wheel arrangement on the one hand to act as a switching element directly for the first gear wheel arrangement but on the other hand also to directly or indirectly influence the rotational behaviour of the second gear wheel arrangement, which in and of itself can be switched by means of its own switching gear element. The switch actuator can be directly engaged with one or more gear wheels of the second gear wheel arrangement, for example a planetary gear set with the second gear arrangement is tightly coupled to or engaged with the first gear arrangement, which forms or comprises the at least one gear wheel of the first gear wheel arrangements. The planetary gear sets can no longer be rotated relative to one another and are coupled to one another such that they cannot rotate by means of the switching gear element, for example a hollow wheel.

Another or an additional possible embodiment provides for the switch actuator, in other words the switching gear element of the first gear wheel arrangement, having an influence on the switching gear element of the second gear wheel arrangement, such that it can, for example, no longer rotate relative to the gearbox housing, but in the second setting position of the switching gear element the switching gear element of the second gear arrangement can be rotated relative to the gearbox housing. The second switching gear element can therefore be a roller base for the at least one gear wheel of the second gear wheel arrangement, which roller base can roll the second switching gear element accordingly.

The switching gear elements and the gear wheels of the gear wheel arrangement are preferably toothed wheels. Of course, the invention would also be easily possible in a rolling wheel drive or friction wheel drive.

In any case, the invention means that only the switching gear element of the first gear wheel arrangement needs to be adjusted in order to switch not only the first gear wheel arrangement but also the second gear wheel arrangement. This makes actuation significantly easier. For example, it is easier to construct an actuation device that only needs to be connected to or to control the switching gear element of the first gear wheel arrangement in order to act not only on the first gear wheel arrangement but also on the second gear wheel arrangement. For example, this can mean that a housing opening on a gearbox housing of the gearbox is not necessary that would otherwise have been necessary to control or actuate the switching gear element of the second gear wheel arrangement.

A configuration can provide for the switching gear element of the second gear wheel arrangement being tightly fixed in the first setting position of the switch actuator relative to the gearbox holding structure, in other words for example the gearbox housing, and to be rotatable in the second setting position relative to the gearbox holding structure. In the fixed position of the switching gear element of the second gear wheel arrangement, planetary gears, in other words the at least one gear wheel of the second gear wheel arrangement, can roll the switching gear element. In the rotatable position of the switching gear element of the second gear wheel arrangement, the at least one gear wheel, for example a planetary gear, can take the second gear wheel arrangement of the switching gear element with it, or rotate it simultaneously.

The switching gear element of the second gear wheel arrangement advantageously has at least one anti-rotation contour to engage in a positive-locking counter-contour of the gearbox holding structure and/or of the switching gear element that forms the switch actuator for the fixed regulation of the gearbox holding structure, for example the gearbox housing. The anti-rotation contour and the positive-locking counter-contour can for example be a pairing of teeth and spaces between the teeth or teeth recesses, a pairing of an anti-rotation projection and an anti-rotation recess, a groove structure or the like. It is possible for the switching gear element of the second gear arrangement to have several anti-rotation contours or to have anti-rotation contours on various sides, such that it can be fixed in a positive-locking manner on several components, for example on a positive-locking counter-contour of the gearbox housing that is fixed to the housing and/or on the switch actuator.

For example, the anti-rotation contour is arranged on a radial outer circumference on one front face or both of the switching gear element that can be switched by the switch actuator. Tooth structures may for example be provided there.

The switching gear element which forms the switch actuator can have arch-shaped teeth on its inner circumference as a positive-locking counter-contour, by means of which teeth in the first setting position the anti-rotation contour engages with the switching gear element which can be switched by the switch actuator and in the second setting position is engaged with the at least one gear wheel of the first gear wheel arrangement, for example the radial outer teeth. For example, this gear wheel meshes with the switching gear element or switch actuator.

In the first setting position it is advantageous if the switching gear element which forms the switch actuator is fully disengaged from the at least one gear wheel of the first gear wheel arrangement, in particular is out of direct engagement with the at least one gear wheel of the first gear wheel arrangement or all gear wheels of the first gear wheel arrangement. Consequently the switching gear element only then fulfils the function of a switch actuator for the other switching gear element, the switching gear element in the second gear wheel arrangement.

A configuration in which the switching gear element of the first gear wheel arrangement engages with the at least one gear wheel of the first gear wheel arrangement, for example a planetary gear set or at least two planetary gears of the first gear wheel arrangement if the switch actuator is in the first switch position is also possible. This is a possible configuration in the case of a coupling of planetary gear sets, with the components of the first gear wheel arrangement and the second gear wheel arrangement making up the configuration.

In the second setting position of the switch gear element which forms the switch actuator, the switching gear element of the at least one second gear wheel arrangement, in other words the switched switching gear element, can be rotated relative to the gearbox holding structure such that it can be moved along by the at least one gear wheel of the at least one second gear wheel arrangement. Consequently the switching gear element of the second gear wheel arrangement can rotate into the second setting position of the switch actuator and therefore be moved along by the one or more gear wheels of the second gear wheel arrangement.

The switching gear element which can be switched by the switch actuator is expediently mounted in a rotatable manner relative to the gearbox holding structure. It can also, in addition or alternatively to this, be received onto or into the gearbox holding structure in a linear, fixed manner. This is advantageous in particular if the switching gear element of the second gear wheel arrangement is fixed relative to a rotational axis of the gearbox output or its own rotational axis.

A bearing can be arranged on the gearbox housing or the gearbox holding structure for the rotatable mounting of the switching gear element which can be switched by the switch actuator of the second gear wheel arrangement, for example a bearing groove and a bearing projection, a roller bearing, in particular a needle bearing, ball bearing or the like. A supporting body is preferably arranged in a locally fixed manner relative to the gearbox holding structure, on the outer circumference and/or inner circumference of which the switching gear element of the second gear wheel arrangement is rotatably mounted. The at least one gear wheel of the second gear wheel arrangement is also provided for the rotatable mounting of the switching gear element. Consequently, the switching gear element of the second gear wheel arrangement can be rotatably mounted on one or more gear wheels of the second gear wheel arrangement or using the gear wheels. This is possible for example if the switching gear element of the second gear wheel arrangement is designed as a hollow wheel which surrounds the planetary gear set in a ring and is mounted on the planetary gear set.

It is further advantageous if the switching gear element of the second gear wheel arrangement can only be switched or actuated by the switching gear element which forms the switch actuator or the switching gear element of the first gear wheel arrangement. An actuating device which for example can be actuated directly by the operator from outside of the machine housing is therefore only linked to the switching gear element of the second gear wheel arrangement by means of the switching gear element of the first gear wheel arrangement and/or not directly.

The switching gear element which forms the switch actuator is expediently displaceably mounted in a linear manner relative to the gearbox holding structure, for example parallel to a rotational axis of the gearbox drive and/or the gearbox output or its own rotational axis, between the first setting position and the second setting position. The switching gear element which forms the switch actuator is expediently in one, two or more in particular settings positions relative to the gearbox holding structure pivot point. It is possible for as it were the switching gear element of the first gear wheel arrangement to be rotatable in a setting position, for example in an intermediate setting position that is between two further setting positions. The operator can then as it were move the switch actuator from a fixed setting position into a rotatable setting position relative to the gearbox housing or the gearbox holding structure by for example adjusting it in a linear manner, rotating it or the like.

It is further advantageous if one or more, in particular all, of the switching gear elements is/are spring-loaded in a respective switch position. In this way, for example, the switching gear element of the second gear wheel arrangement can be spring-loaded by means or a spring arrangement in one or both of the first and second setting positions. If the teeth of one of the switching gear elements do not fit with the respective gear wheel of the first or second gear wheel arrangement to be switched or meshed, the spring loading ensures that where the teeth do match the matching teeth glide into the respective places.

The gear wheels of the first gear wheel arrangement which are or can be in rolling engagement and the at least one second gear wheel arrangement are expediently different from one another in terms of their diameter and/or they have different roller circumferences from one another in terms of their diameter for the rolling engagement with the respective assigned switching gear element. This means that different speed ratios can expediently be set between the gearbox drive and the gearbox output.

The gear wheels of the first gear wheel arrangement which are or can be in rolling engagement and the at least one second gear wheel arrangement are expediently fixed to one another in a manner that prevents rotation and/or are designed on at least one stepped planetary gear. A planetary gear set preferably has at least two stepped planetary gears. A stepped planetary gear has for example a smaller and a larger roller circumference, between which there is a step.

Expediently there is a provision for a radial outer circumference of the switching gear element of the second gear wheel arrangement to align with the radial outer circumference of the at least one gear wheel of the first gear wheel arrangement such that the switching gear element which forms the switch actuator can be adjusted between the outer circumferences of the switching gear element of the second gear wheel arrangement and the at least one gear wheel of the first gear wheel arrangement in a linear manner, in particular parallel to a rotational axis of the gear wheel. The switching gear element of the second gear wheel arrangement therefore does not protrude in a radial outer direction in front of the at least one gear wheel of the first gear wheel arrangement, it is instead aligned with it. This alignment should be understood, however, as meaning that an angular offset can be present between positive-locking contours, for example teeth, of the switching gear element that can be adjusted in a linear direction and the switching gear element of the second gear wheel arrangement or the at least one gear wheel of the first gear wheel arrangement, which angular offset is then cancelled out in the event of a further movement of the gearbox such that the linear adjustment of the switching gear element is possible. For example the switching gear element of the second gear wheel arrangement is a hollow wheel which is arranged on the outer circumference of one or more planetary gears of the second gear wheel arrangement and on its outer circumference has teeth that have the same tooth geometry as the at least one gear wheel, in particular planetary gear, of the first gear wheel arrangement and is aligned with the gear wheel of the first fear wheel arrangement such that the switching gear element designed as a hollow wheel and serving as a switch actuator can be adjusted in a linear manner between the outer circumferences of the hollow wheel of the second gear wheel arrangement and the at least one gear wheel of the first gear wheel arrangement.

The gear wheels which are or can be in rolling engagement with the switching gear elements of the first gear wheel arrangement and the at least one second gear wheel arrangement are for example connected to one another in a fixed manner or in one piece. They can also form stepped gears or stepped planetary gears.

It is also possible for the gear wheels which are or can be in rolling engagement with the switching gear elements of the first gear wheel arrangement and the at least one second gear wheel arrangement to be separate from one another but arranged on a common planetary gear support or bar.

A further embodiment of the invention provides for the gearbox drive to be connected to a sun wheel in a fixed manner or coupled in a manner which permits rotation, which sun wheel is in a rolling engagement with the at least one gear wheel of the first gear wheel arrangement. It would also be conceivable, however, for the sun wheel to be engaged with one or more gear wheels, for example planetary gears, of the second gear wheel arrangement.

The gear wheels of the first gear wheel arrangement and the second gear wheel arrangement can be arranged on a common planetary gear support or bar, but can also be arranged on separate, in particular rotatable or movable relative to one another planetary gear supports or bars.

The first gear wheel arrangement and the second gear wheel arrangement expediently form a first gearbox step, wherein the gearbox has at least a second gearbox step, for example a planetary step. The first gearbox step is upstream or downstream of the gearbox output of the second gearbox step. In particular, the gearbox steps are therefore arranged sequentially one behind the other.

The second gear wheel step can be a gearbox step providing a fixed speed ratio, in other words merely a gearbox step that decreases or increases speed and cannot be switched. A switchable configuration is, however, preferred. The second gearbox step can expediently be switched between at least two switch positions in which a speed ratio between a drive of the first gearbox step and an output of the second gearbox step is different. This means, for example, a four-speed gearbox can be achieved.

The switching gear element of the first gear wheel arrangement and/or the switching gear element of the second gear wheel arrangement, in particular both, are preferably hollow wheels or have hollow wheels.

An advantageous embodiment provides for the gearbox to have a first switching gear element and a second switching gear element, one of which is the switch actuator, in other words the switching gear element of the first gearbox arrangement and the other switching gear element is a further, separate switching gear element switched by the switching gear element of the second gearbox arrangement. In total, the gearbox therefore has three switching gear elements, of which the first and second switching gear elements described below can advantageously be actuated by means of the actuation concept described below. The first and the second switching gear elements can be adjusted in a linear manner using an actuating device between a first setting position and a second setting position in each case relative to the gearbox holding structure which in this case is designed as a gearbox housing, wherein the actuating device is coupled to the switching gear elements and has an actuating part that is rotatably mounted about an actuating pivot axis relative to a machine housing of the manual machine tool, wherein the first switching gear element can be adjusted by a pivoting movement of the actuating part amount the actuating pivot axis in a linear manner along its setting axis using a deflecting gear, wherein the deflecting gear comprises a carrier ring which extends in a ring shape about the gearbox housing and rotatably mounted about the actuating pivot axis, which carrier ring is coupled to the first switching gear element in order to adjust this in a linear manner using a first coupling element. In this configuration, there is a provision for the actuating part to be displaceably mounted on the carrier ring in a linear manner along an actuating longitudinal axis and coupled to the at least second switching gear element using a second coupling element to achieve linear displacement of the second switching gear element.

The fundamental idea of this is that in principle the carrier ring forms a rotating body or a pivot bearing for the actuating part. The actuating part can therefore pivot about the gearbox housing with the carrier ring in order to switch the first switching gear element. In turn, the actuating part is displaceably mounted in a linear manner on this carrier ring, such that it can carry out the linear movement to adjust the second switching gear element directly. A further slide or support for the actuating part or the second coupling element is not necessary. It is also possible in this arrangement to carry out the two actuating movements, namely about the actuating longitudinal axis and actuating pivot axis, which can occur in parallel to one another, in an overlaid manner such that the first switching gear element and the second witching gear element can be switched simultaneously and the gearbox can be switched for example from a first switch position or a first gear directly into a third gear or a third switch position without the second or an intermediate switch position or a gear arranged in between needing to be controlled.

Compared to the embodiment of a gearbox according to EP 1 886 769 A1 mentioned at the outset, this therefore results in simpler operation.

Compared to EP 2 551 063 B1, the actuating device and the coupling between the actuating device and the switching gear element is simpler in structure. In particular, a single coupling element, the second coupling element, is sufficient between the actuating part and the second switching gear element. This can even be arranged in one piece on the actuating part if there is a corresponding degree of rotational freedom between the second coupling element and the second switching gear element.

A spring arrangement is expediently arranged between the actuating part and the first switching gear element or the second switching gear element or both. The spring arrangement places a load on the switching gear element in its respective setting position or a setting position assigned to the position of the actuating part during and/or after an actuation of the actuating part. If the switching gear element cannot reach its setting position, for example because its teeth are not aligned with the teeth of a gear wheel that works with the switching gear element, the spring loading ensures that in the event of a relative rotational adjustment of the switching gear element and gear wheel, the two components can mesh together in a positive-locking manner.

The spring arrangement between the second switching gear element and the actuating part can in particular be provided by the second coupling element, for example exclusively by the second coupling element. It is also possible, however, for a spring or spring arrangement which is separate to this to be provided. A spring arrangement and the elastic coupling element can also be provided. The spring arrangement can however easily be provided between the first switching gear element and the actuating part by the first coupling element.

The first coupling element or the second coupling element or both can for example comprise or be a spring element. In particular, a spring bow or the like is suitable as an elastic, flexible coupling element, for example as described in EP 1 886 769 B1.

The first coupling element and/or the second coupling element expediently comprises a spring bow or is formed by a spring bow. The spring bow expediently extends in a ring shape about the first switching gear element or the second switching gear element. The spring bow can for example have bow arms, which are elastic and flexible. The longitudinal ends of the spring bow expediently engage in corresponding recesses, for example bores, grooves, guides, in particular longitudinal guides or the like, on the respective first or second switching gear element.

A preferred and simple embodiment provides for the actuating part to be coupled to the second switching gear element exclusively by means of the second coupling element or by means of a single component. Consequently no further component is necessary between the switching gear element and the actuating part. In particular, the spring bow which has already been mentioned is suitable as a second coupling element and extends as a single component to make the connection between the actuating part and the second switching gear element.

A for example ring-shaped, rod-shaped or otherwise similarly designed transmission part is arranged between the carrier ring and the first coupling element, which transmission part can be moved about the actuating pivot axis together with the carrier ring. The transmission part and the carrier ring can be moved relative to one another, for example they are rotatable and/or displaceable relative to one another. A spring arrangement is arranged between the transmission part and the carrier ring which can be actuating by means of a relative movement of the transmission part and the carrier ring in order to achieve spring-loading of the first setting gear element in at least one switch position. Consequently, the carrier ring can reach a final rotation position while the transmission part has not yet reached this final position and is spring-loaded in the final position by the spring element or the spring arrangement. If the first setting gear element has a suitable position with respect to a component to be switched, for example a gear wheel, it is pushed or adjusted into this final position by the spring arrangement.

At least one guide cam is expediently arranged on the carrier ring or a transmission part that can be moved together with the carrier ring about the actuating pivot axis, for example the above-mentioned protruding part which can be adjusted relative to the carrier ring in order to deflect the movement of the actuating part about the actuating pivot axis into a linear movement of the first setting gear element. The first coupling element or a body associated with this or coupled to this engages with the guide cam. Two guide cams are preferably provided which are arranged on opposite sides of the gearbox housing or the gearbox holding structure.

The second coupling element is expediently pivotably and/or displaceably mounted relative to the gearbox housing. Consequently it is possible for the second coupling element, which is adjusted in a linear manner, to transfer the linear movement to the second setting gear element on the basis of a displacement relative to the gearbox housing. However, a pivot bearing or a combined pivot and thrust bearing of the second coupling element is also possible.

The second coupling element is expediently pivotably mounted on a pivot bearing provided on a gearbox housing, for example a bearing pin which protrudes from the circumference wall of the gearbox housing or a bearing recess arranged in the circumference wall of the gearbox housing. The second coupling element can also alternatively or additionally be pivotably mounted on the actuating part. The bearing recess can for example be achieved by a longitudinal groove. This longitudinal groove can also be the arch-shaped guide recess described below. If bearing pins or bearing recesses are provided on the gearbox housing, these are expediently provided on opposite sides of the gearbox housing and/or on an area of the gearbox housing which is largest in size. Consequently, the bearing pins protrude for example in a radial direction in front of the circumference wall of the gearbox housing.

The actuating part expediently has a guide recess which extends in an arch shape about the actuating pivot axis and engages in the second coupling element. In particular, the second coupling element has a straight or curved section which engages in the above-mentioned guide recess. It is possible for the guide recess to be of a sufficient depth for an arch-shaped moving space to be present in which the second coupling element can engage when it pivots about the actuating pivot axis.

A grid arrangement is preferably provided which is used to lock the actuating part in at least one actuating position. The grid arrangement has for example a locking recess or an arrangement of several locking recesses on the actuating part. The locking arrangement is preferably arranged in a hidden manner. The locking arrangement is preferably arranged on a lower side of the actuating part and/or between the actuating part and the gearbox housing. One or more locking recesses can be provided on the actuating part in which a locking part, in particular a sprung or elastic locking part engages, which locking part is arranged on the gearbox housing. The elastic locking part can, however, also be arranged on the actuating part and engage in the locking recesses on the gearbox housing. The actuating part can therefore be locked in a respective switch position, for example in the respective longitudinal end position relative to the actuating longitudinal axis and/or a pivot position relative to the actuating pivot axis.

The actuating part is expediently displaceably mounted in a linear manner on a linear guide of the carrier ring. Consequently, the carrier ring has a linear guide with one or more guide grooves or other linear guide elements of the like. Linear guide projections can also be provided, for example longitudinal ribs or the like, which stick out from the carrier ring and engage in corresponding longitudinal guide grooves on the actuating part. Consequently, linear guide components are present on the carrier ring and on the actuating part.

A further embodiment provides for the actuating part to be guided on a machine housing of the manual machine tool. For example, a wall of the machine tool has a slot or recess in which the actuating part is arranged. Guide recesses, in particular guide grooves, pockets or the like can be provided on one or more edge areas of the recess to guide the actuating part.

The second coupling element expediently engages in a slot of the linear guide. For example, the linear guide has linear guide sections, between which the slot is arranged. The linear guide sections are expediently connected by means of connection sections. The second coupling element engages between the connection sections and the actuating part.

The linear guide expediently comprises two linear guide sections arranged at an angular distance from one another relative to the actuating pivot axis. Consequently, the actuating part can be guided on two or more linear guide sections, which can also be interrupted, for example by the above-mentioned slot.

The actuating part expediently has at least one support section to support the gearbox housing. Consequently the actuating part is supported on one side by the carrier ring and on the other side on the gearbox housing.

It is preferable for the actuating part to have an arch-shaped or barrel-shaped wall design. Consequently, it is advantageous for the actuating part to cover the components and/or the locking arrangement to be actuated by it.

A further embodiment can provide for the actuating part to connect longitudinal end areas of the carrier ring that are at a distance from one another to one another. The carrier ring has a distance between its longitudinal end areas that is bridged by the actuating part. For example, the actuating part engages in linear guide sections arranged on the longitudinal end area such that these linear guide sections are connected to one another relative to the actuating pivot axis. The actuating part therefore closes the carrier ring as it were.

At this point it should be noted that the carrier ring can be a closed ring, in other words it fully surrounds the gearbox housing. It is also possible, however, for the carrier ring to only be a partial ring. Consequently, the carrier ring can be designed as a ring segment. The carrier ring preferably extends around at least half of the outer circumference area of the gearbox housing, in other words around at least 180 degrees. It is preferable for the carrier ring to extend around at least 270 to 300 degrees of the outer circumference of the gearbox housing.

The gearbox is expediently a planetary gear. Other types of gear are, however, also easily possible.

The first and/or the second setting gear element expediently comprises a hollow wheel or is formed by a hollow wheel. In particular, there is a provision for one of the hollow wheels to be arranged on the outer circumference of the other hollow wheel.

Advantageously there is a provision for a radial outer circumference of the switching gear element of the second gear wheel arrangement and a radial outer circumference of the at least one gear wheel of the first gear wheel arrangement to be aligned with one another such that the switching gear element of the first gear wheel arrangement can be brought into engagement, in particular meshing engagement, with the radial outer circumference of the at least one gear wheel of the first gear wheel arrangement or the switching gear element of the second gear arrangement. For example, the at least one gear wheel of the first gear wheel arrangement is a planetary gear or comprises a planetary gear. It is preferable for a radial outer circumference of a planetary gear set to which the gear wheel of the first gear wheel arrangement belongs and a radial outer circumference of the switching gear element of the second gear wheel arrangement to be aligned with one another. In particular, teeth with the same teeth distances or teeth geometries are present on the respective radial outer circumferences of the switching gear element of the second gear wheel arrangement and the gear wheel of the first gear wheel arrangement such that the switching gear element of the first gear wheel arrangement can be brought into meshing engagement with both sets of teeth.

It is preferable for the switching gear element of the first gear wheel arrangement, in other words the switch actuator for the second gear wheel arrangement to engage with either the switching gear element of the second gear wheel arrangement or the at least one gear wheel of the first gear wheel arrangement, in particular to mesh with the at least one gear wheel.

The embodiment of the invention described below in greater detail in the drawing shows a screwing machine or drilling machine. Of course the invention can also be used in other manual machine tools, for example milling machines, cutting machines, saws, grinding machines, polishing machines and the like. The gears and/or the actuating device can, however, also be used in manual machine tools, for example, which have a tool holder that is driven in an oscillatory manner, for example moved backwards and forwards in a linear manner.

The manual machine tool expediently has a tool holder for a tool and/or a tool, for example a drilling tool, screwing tool or the like. A cutting tool, milling tool or the like can, however, also be provided.

The gearbox output of the gearbox is expediently directly rotationally coupled to a tool holder on the manual machine tool. A recess for a screw bit, drill chuck, screw chuck or a tool chuck of the like can be provided, for example. It is also advantageous if a striking mechanism is arranged on the gearbox output, for example an axial striking mechanism.

It is also possible for an angle gear to be present between the gearbox and a tool holder, for example an angular gearbox or a conversion gearbox, which converts the rotating output movement of the gearbox output into an oscillatory linear movement or a hypercycloid and/or eccentric movement of the tool holder.

BRIEF DESCRIPTION OF THE DRAWINGS

An embodiment of the invention is described below on the basis of the diagrams, in which:

FIG. 4 is an exploded diagram of a powertrain of the manual machine tool including the gearbox and with a drill chuck, FIG. 5 is an exploded diagram of an actuating device for the gearbox, FIG. 6 is a lower view of an actuating part of the actuating device according to FIG. 5, FIG. 7 is a planar view of the actuating part according to FIG. 6 installed into a housing of a manual machine tool, FIG. 8 is a lateral view of the gearbox according to FIG. 3, FIG. 9 is a sectional view of the gearbox according to FIG. 8 along a cutting line B-B in FIG. 8, FIG. 10 is a frontal view of the gearbox according to the above figures in the direction of sight according to FIG. 1 in a first and a second switch position of the gearbox, FIG. 11 is the view according to FIG. 10 but in a third and fourth switch position of the gearbox, FIG. 12 is the gearbox according to the figures above in a sectional view according to the cutting line C-C in FIG. 10 in a first switch position, FIG. 13 is the gearbox according to FIG. 12 but in a second switch position, FIG. 14 is a cross-sectional view of the gearbox according to the above figures in a third switch position, for example according to a cutting line F-F in FIG. 11 and FIG. 15 is a cross-sectional view of the gearbox according to FIG. 14 but in a fourth switch position.

DETAILED DESCRIPTION

Figure 1:
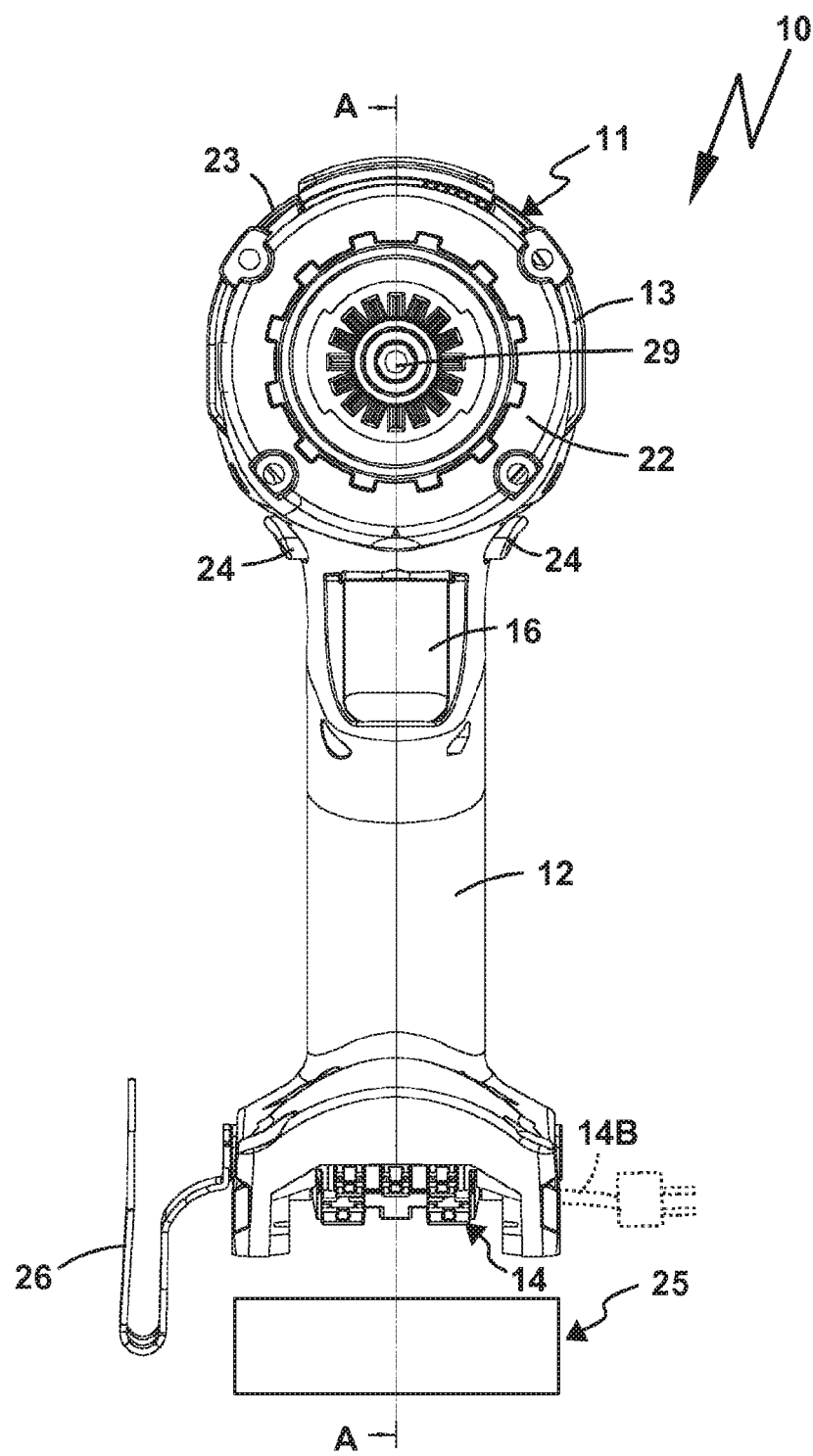
FIG. 1 is a frontal view of a manual machine tool according to the manual machine tool, which is shown in FIG. 2 in a transverse section along cutting line A-A in FIG. 1.

A manual machine tool 10, for example a screwing device, has a machine housing 11 which is preferably pistol-like in shape. An operator can grip the machine housing 11 and therefore the manual machine tool 10 using a handle section 12 which protrudes from a motor section 13 of the machine housing 11. An energy storage interface 14 is provided on a foot area or a free end area of the handle section 12 which faces away from the motor section 13, to which energy storage interface an energy storage device 25 such as a battery pack can be attached. Consequently the manual machine tool 10 can be operated in a self-sufficient and wireless manner, but it does not have to do so. A manual machine tool having a mains connection 14B for an AC network, in particular a connection cable with a plug and/or a socket for a connection cable, in particular a power cable, or a manual machine tool with an energy storage interface and a mains connection would easily also be possible.

The energy storage interface 14 supplies a power supply device 15 with electrical energy. The power supply device 15 can be actuated by means of a switch 16 which is preferably arranged on the handle section 12 to supply power to a drive motor 17 that is received in the motor section 13 of the machine housing 11, in particular to set its speed and/or torque.

The drive motor 17 has a motor shaft 18 which extends in a longitudinal direction of the motor section 13. The motor shaft 18 is rotatably mounted on motor bearings 19. The drive motor 17 has for example an exciter coil arrangement 20 which is penetrated by the motor shaft 18 and which is rotatably received in a rotor, in particular a permanent magnet rotor, a squirrel-cage rotor or the like.

The drive motor 17 is arranged in the machine housing 11 in a fixed position. Its motor shaft 18 extends from a rear wall 21 in the direction of a front face 22 of the motor section 13. An upper side wall 23 of the machine housing 11 is provided on the side of the motor section 13 which faces away from the handle section 12. A rotation direction alternator 24 is preferably arranged between the handle section 12 and the motor section 13, by means of which the direction of rotation of the drive motor 17 can be set or changed.

A hook element 26 is preferably provided on a free end area or another point in the machine housing 11 to hang up the manual machine tool, for example on a user's belt.

A motor output 27 of the drive motor 17 drives a gearbox 40 of the manual machine tool.

The gearbox 40 has a gearbox drive 41 designed as a drive wheel and/or drive shaft or having a drive wheel and/or a drive shaft, which gearbox drive is connected to the motor drive 27 in a fixed manner.

A gearbox drive 42 of the gearbox drives a tool shaft 28, for example, which protrudes from the front face 22 of the machine housing 11.

The tool shaft 28 has a tool holder 29 for example for a tool 30, for example a drilling tool, a screwing tool or the like. The tool shaft 28 is for example rotatably mounted by means of a bearing 31 on the machine housing 11. The tool shaft 28 can also be mounted directly by the gearbox 40 or on the gearbox 40, for example using a bearing 43.

It is also advantageous if in a manual machine tool according to the invention a striking mechanism for example an axial striking mechanism and/or rotational striking mechanism is arranged on the output of the gearbox. A striking mechanism of this kind can also easily be integrated into the gearbox. A striking mechanism 200 is provided in the specific embodiment.

An impact body 201 of the striking mechanism 200 is for example formed by the tool shaft 28 or fixed to this. The impact body 201 is for example a ring which is penetrated by the tool shaft 28 and is connected to the tool shaft 28 in a manner that prevents it from rotating and that is fixed in an axial direction.

The impact body 201 is force-actuated by means of a spring 202 in a forwards direction SW1, in other words towards the tool holder 29.

Figure 2:
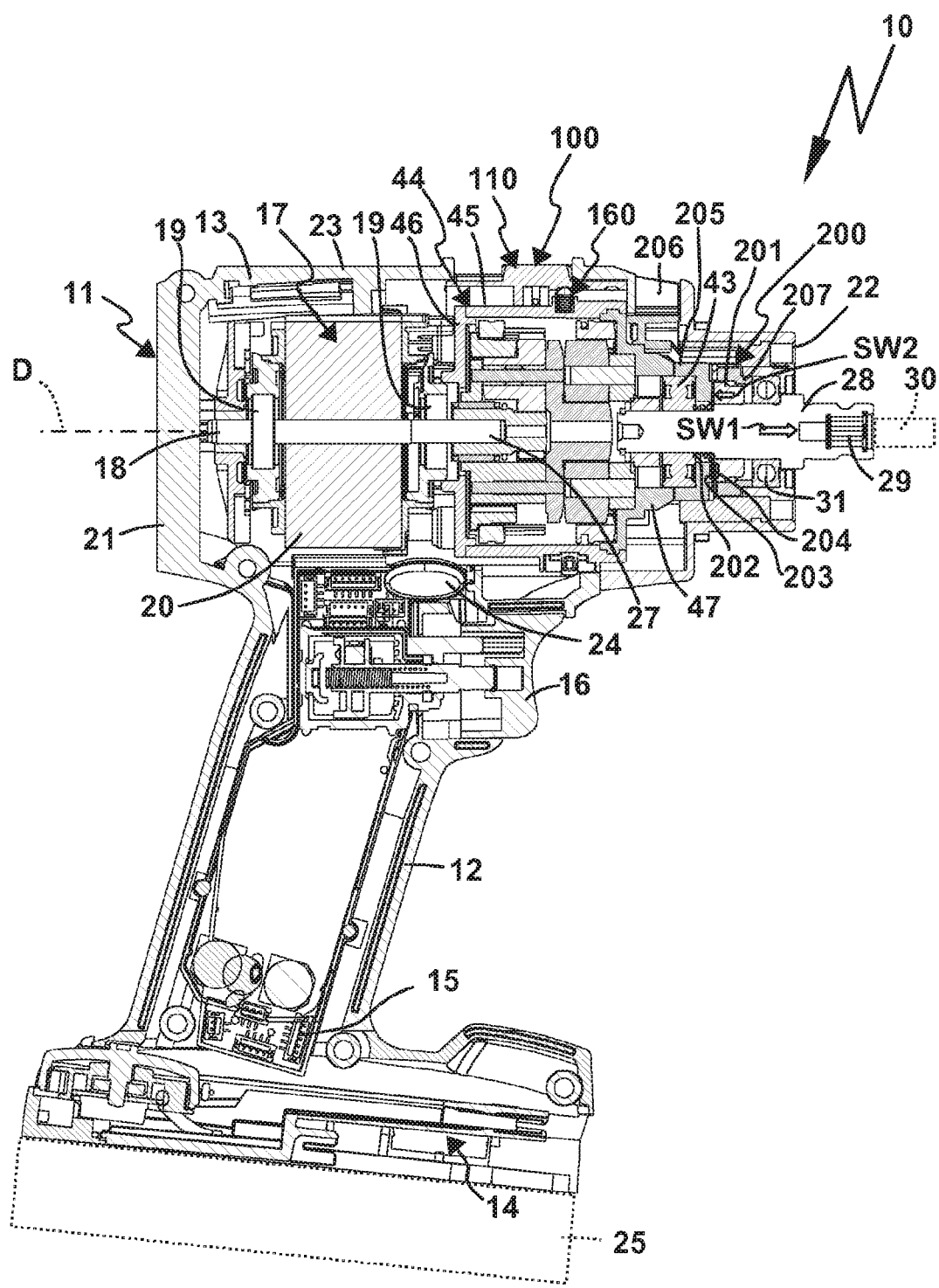
Figure 3:
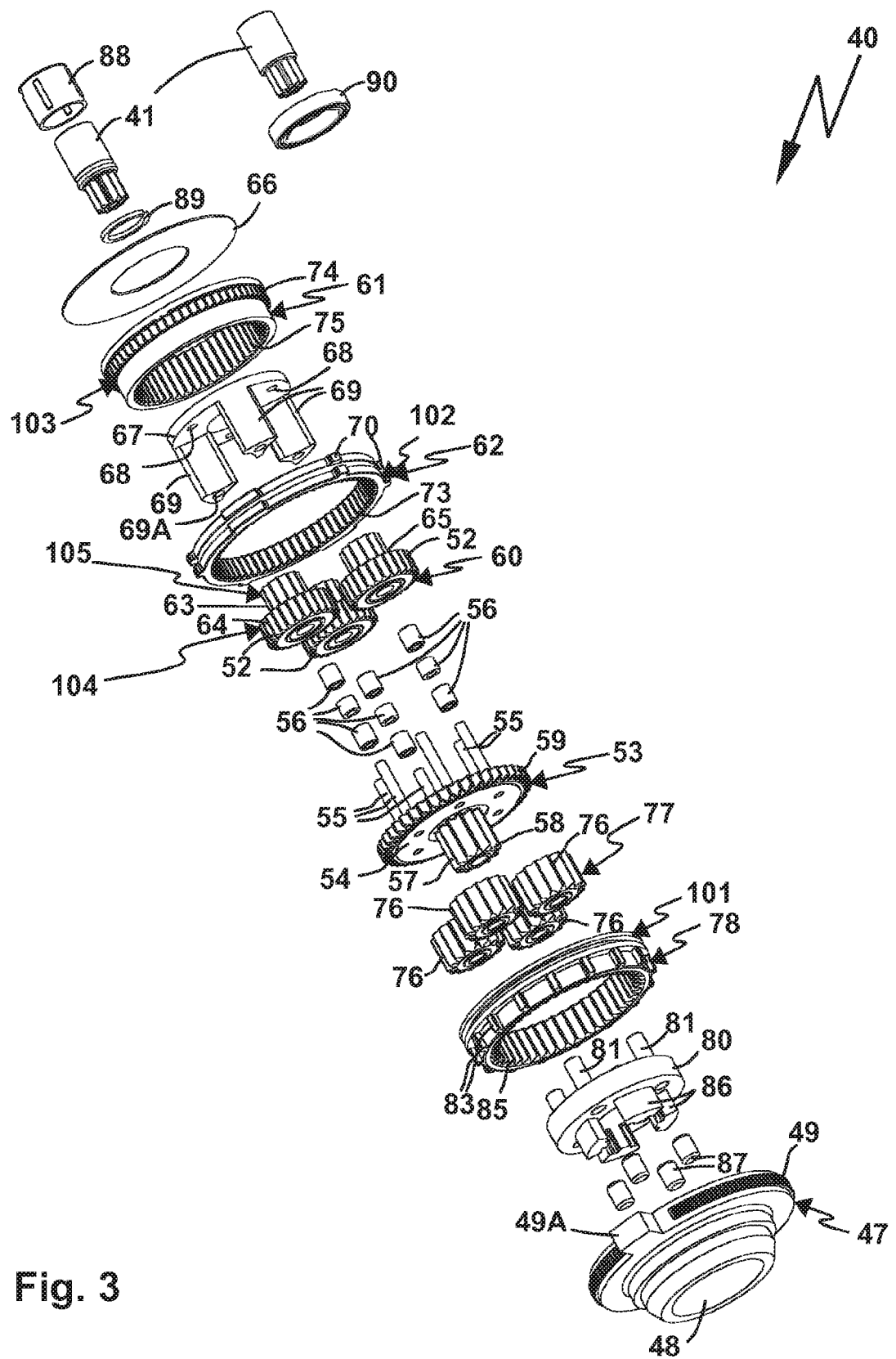
FIG. 3 is an exploded diagram of a gearbox of the manual machine tool according to the above figures.

The striking mechanism 200 can be switched between a described striking operation and a non-striking operation, for example by means of an actuation of an actuating element 206 that can be gripped by the operator. The actuating element 206 comprises, for example, a slider or a rotary element. The actuating element 206 can be adjusted as a setting body 207 between the switch position shown in FIG. 2 and assigned to the striking operation in which the tool shaft 28 including the bearing 31 can be displaced in a linear manner relative to the rotational axis D, in other words has an end clearance and therefore teeth 203, 204 can engage with one another, and a further switch position that is not shown in the drawing which represents a non-striking operation and in which the teeth 203, 204 are kept apart from one another. The bearing 31 is held on the setting body 207. The tool shaft 28 is displaceably mounted on bearing 43 relative to the rotational axis.

The teeth 203 are arranged on an abutment body 205 which is arranged between the bearing 43 and the impact body 201 and is fixed in position (prevented from rotating and fixed to prevent displacement) relative to the machine housing 11. The teeth 203 are opposite the teeth 204 arranged on the impact body 201. The teeth 203, 204 are arranged on the respective front faces of the abutment body 205 and the impact body 201. The teeth 203, 204 are preferably angular teeth. The teeth 203, 204 preferably extend in a ring-shaped or partially ring-shaped manner about the rotational axis D of the tool shaft 28.

If there is pressure in a direction of force SW2 on the tool shaft 28, for example if the tool 30 is loaded against the machine housing 11 by means of a screw or a workpiece, the teeth 203, 204 glide along one another, wherein they adjust the impact body 201 in the direction of force SW2 such that a spring 202 force-actuated with a direction of force SW1 is tensioned. If the teeth 203, 204 are further rotated from one pair of teeth into the next pair of teeth, they can immerse into one another suddenly when loaded by the spring 202, such that a strike occurs in the direction of force SW1 on the tool shaft 28 and consequently the tool holder 29.

An embodiment that is only partially indicated in FIG. 4 provides for a recess chuck 32, for example a drill chuck, instead of the tool shaft 28, which recess chuck is suitable for holding for example the tool 30.

The gearbox 40 is a four-speed gearbox. The gearbox 40 can therefore be switched between four gears or switch positions S1, S2, S3 and S4 which are showing in FIGS. 12, 13, 14 and 15.

The gearbox is received in a gearbox housing 44. The gearbox housing 44 has a circumference wall 45 which delimits an essentially cylindrical inner space in which the gearbox components, pinions and the like of the gearbox are essentially received. On the front face the gearbox housing 44 is covered by front walls 46, 47, for example covers. The front walls 46, 47 have openings 48 through which the motor drive 27 can be connected to the gearbox drive 41 and the tool shaft 28 or the recess chuck 32 to the gearbox drive 42 of the gearbox 40. The openings 48 are for example penetration openings.

The gearbox housing 44 is received in the machine housing of the manual machine tool 10 in a manner that prevents it from rotating, which is why for example teeth 49 and/or an anti-rotation projection 49A are provided on the front wall 47 which faces aware from the tool holder 29 and/or a circumference contour 50 designed in the manner of anti-rotation protection are provided on the front wall, which faces away from the drive motor 17.

Consequently the gearbox housing 44 which forms a base gearbox housing (the circumference wall 45) and the front walls 46, 47 which form the covers essentially tightly enclose the gearbox components of the gearbox 40 described below, which is which sealing elements, in particular textile seals, plastic seals, O-rings, labyrinth seals etc. can be provided.

The gearbox 40 has a first gear step G1 and a second gear step G2. The first gear step G1 forms an initial gear step and can be driven by the gearbox drive 41. The second gear step G2 forms an output gear step and drives the gearbox output 42 of the gearbox 40.

The gear steps G1 and G2 are planetary gear steps. Overall, the gearbox 40 is designed as a planetary gearbox.

The gear step G1 comprises a sun wheel 51 which is arranged on the drive wheel or gearbox drive 41 or is in one piece with the gearbox drive 41. The sun wheel 51 meshes with the planetary gears 51 which are rotatably mounted on a bar or planetary gear support 53. For example the planetary gears 52 are rotatably mounted on axis elements 55 which protrude in front of a carrier body 54. The planetary gears 52 can be mounted directly onto the axis elements 55 or as preferred in the embodiment by means of roller bearings 56, in particular ball bearings or needle bearings, which improves the rotatability and the bearing. On the one hand the axis elements are on opposite sides of the carrier body 54 and on the other hand there is an output 57 on the carrier body which forms a sun wheel 58 for the second gear step G2. Teeth 59 are provided on a radial outer circumference of the planetary gear support 53 or the carrier body 54.

The planetary gears 52 form a planetary gear set 60, to which a first hollow wheel 61 and a second hollow wheel 62 are assigned.

The planetary gears 52 are step planetary gears as it were. The planetary gears 52 have roller circumferences 63, 64 with different diameters which are assigned to the first and the second hollow wheels or mesh with these when a corresponding switch position of the gearbox 40 is set.

The hollow wheel 61 is mounted in a rotatable manner in the gearbox housing 44 but cannot be displaced in an axial direction.

In the embodiment the hollow wheel 61 is received between the front wall 46 and the steps 65 of the planetary gears 52 in a sandwich-like manner.

The hollow wheel 61 is for example supported on its opposite front faces directly or indirectly on the front wall, and opposite this on the other front face on a step 65 provided between the roller circumferences 63, 64. A bearing plate 66 is preferably provided between the hollow wheel 61 and the front wall 46, which bearing plate is received inside the circumference wall 65 in rotatable manner or preferably in a fixed manner to prevent rotation as shown in FIG. 4 by means of corresponding outer circumference contours or rotation positive-locking contours.

It is also possible for the hollow wheel 61 to be held in a non-displaceable manner relative to a rotational axis D of the gearbox output 42 of the gearbox, for example by means of ring contours which are engaged with a support body 61 described in greater detail below. A ring projection can for example protrude in a radial, outwards direction in front of the support body 61 and engages in a ring groove on the inner circumference of the hollow wheel.

In the sense of a stabilisation or a mechanically resilient structure, it is also possible for the axis element 55 to be supported on a support body 67 on the free ends which face away from the carrier body 54. The support body 67 has recesses 68 for at least one of the axis elements 55. Support projections 69 are also provided which as it were delimit recess chambers or recess spaces for the planetary gears 62. It is possible but not essential for part of the axis element 55, in particular an axis element 55 which does not support any planetary gears to engage in the support projections 69 in a positive-locking manner, which is why the support projections 69 have recesses 69A for example. The planetary gears 52 are as it were received between the planetary gear support 53 and the support body 57 in a sandwich-like manner and rotatably mounted on the planetary gear support 53, namely the axis elements 55 of this.

It is understood that the support body 67 and the carrier body 54 can also be in one piece. The support body 67 is also optional, in other words the carrier body 54 would be sufficient to rotatably mount the planetary gears such that the support body 67 is not present in this case.

While the first hollow wheel 61 is mounted in the gearbox housing 44 in a rotatable but non-displaceable manner, the second hollow wheel 61 is mounted in the gearbox housing in a displaceable but non-rotatable manner relative to a setting axis SA. Anti-rotation projections 70 are provided on the radial outer circumference of the second hollow wheel 62 and engage in the anti-rotation recesses 71 of the gearbox housing 44. The anti-rotation projections 70 are preferably designed in the manner of slot grooves, cam followers or the like. They engage in the anti-rotation recesses 71. The anti-rotation recesses 71 are for example designed as longitudinal grooves 72 which run in parallel to the setting axis SA. The anti-rotation recesses 71 or longitudinal grooves 72 extend for example on the inside or on the inner circumference of the circumference wall. The anti-rotation projections 70 and/or the anti-rotation recesses may have different cross-sectional contours, for example have a wider or narrower design in the peripheral direction. It is not specifically about ensuring fundamental functionality that the hollow wheel 62 can be adjusted along the setting axis SA or in parallel to the setting axis SA on the gearbox housing 40 and/or relative to the planetary gear set 60.

In the switch position shown in FIG. 12 and FIG. 14, namely the first switch position S1 and the third switch position S3, the second hollow wheel 52 is in a setting position P1 relative to the setting axis SA in which the second hollow wheel holds the first hollow wheel 61 in the gearbox housing in a manner which prevents it from rotating such that the planetary gears 52 mesh with inner teeth 75 of the first hollow wheel 61 with their smaller roller circumferences 63 and roll on the inner teeth 75. The second hollow wheel 62, which is received in the gearbox housing in a manner which prevents it from rotating, has anti-rotation contour on its inner circumference to hold the first hollow wheel 61 which has corresponding complementary rotational positive-locking contours on its outer circumference in a manner which prevents it from rotating. These rotational positive-locking contours and complementary rotational positive-locking contours are provided by inner teeth 73 of the second hollow wheel 62 and outer teeth 74 of the first hollow wheel 61, which can engage with one another in a positive-locking manner. Consequently the inner teeth 73 of the second hollow wheel 62 have on the one hand the function that the planetary gears 52 can roll on them and on the other hand the function of holding the first hollow wheel 61 in a manner which prevents rotation relative to the gearbox housing 44 and consequently also the machine housing 11 of the manual machine tool 10.

If the second hollow wheel takes the setting position P2 shown in FIGS. 13 and 15 relative to the setting axis SA, the first hollow wheel 61 is released for rotation. Consequently, the planetary gears 52 and the planetary gear set 60 can take the first hollow wheel 61 along with the rotation and experience no or minimal resistance as a result of the hollow wheel. In this situation, the planetary gears 52 roll with their larger roller circumferences 64 on the inner circumference, and consequently the inner teeth 73 of the second hollow wheel, which is essential for the switch positions shown in FIGS. 13 and 15, the second switch position S2 and the fourth switch position S4, of the gearbox 40. The output 57 of the first gearbox step G1 rotates into the second and fourth switch position at a high speed and with a lower torque than in the first and third switch position S1, S3.

The gear step G2 comprises planetary gears 76 of a planetary gear set 77 which engage on the one hand with the sun wheel 58, in other words the output of the first gear step G1, and on the other hand with a third hollow wheel 78. The third hollow wheel 78 is received in the gearbox housing 44 in a manner that is displaceable along a setting axis SB. The setting axis SA can be coaxial or parallel to the setting axis SB. The setting axes SA, SB are shown in FIGS. 12 and 13 by way of an example.

The setting axes SA, SB can also, for example, be coaxial with or concur with a rotational axis D of the gearbox 40 and/or the gearbox drive 41 and/or the gearbox output 42. The rotational axis D of the gearbox 40 is simultaneously the rotational axis of the drive motor 17 such that ultimately the gearbox 40, the drive motor 17 and the gearbox output 42 are coaxial. The tool holder 23 also rotates about the rotational axis D.

The planetary gears 76 are rotatably mounted on a planetary gear support 79, in other words a bar. The planetary gear support 79 has a carrier body 80 with the axis element 81 arranged on one side and the gearbox output 42 arranged on the opposite side. The axis elements 81 protrude from the sun wheel 58 and consequently the output 57 of the first gear step G1 such that the planetary gears 76 rotatably mounted on the axis elements 81 or rotatably mounted by the axis elements 81 are engaged with the output 57 or can be driven by this. The planetary gears 76 can be directly or indirectly rotatably mounted on the axis elements 81, for example by means of roller bearings, in particular needle bearings.

The planetary gear set 77 comprises for example four planetary gears 76 while the planetary gear set 60 comprises three planetary gears 52. These figures should not, however, be understood as restrictive. One planetary gear set can very much also comprise two planetary gears, five planetary gears or another number of planetary gears.

The radial outer circumference of the hollow wheel 78 has anti-rotation projections 83 which are engaged with the anti-rotation recesses 84 on the gearbox housing 44, for example these can be applied to the cover or the front wall 47. In the switch positions S1 and S2 of the gearbox 40 shown in FIGS. 12 and 13, the third hollow wheel 78 takes on a setting position P3 relative to the setting axis SB in which the third hollow wheel 78 is fixed in a manner which prevents rotation relative to the rotational axis D or the gearbox housing 44. The anti-rotation projections 83 then engage in the anti-rotation recesses 84.

In a setting position P4 relative to the setting axis SB, however, the anti-rotation projections 83 of the third hollow wheel 78 are arranged free from or beyond the anti-rotation recesses 84 such that the hollow wheel 78 can rotate about the rotational axis D.

In setting position P3, the fixed position of the third hollow wheel 78 to prevent against rotation, the outer circumferences of the planetary gears 78 roll on inner teeth 85 of the hollow wheel 78. The second gear step G2 causes a reduction and speed and therefore an increase in torque from its input side to its output side or from its drive to its gearbox output 42.

In the setting position P4 of the hollowing wheel 78, however, the wheels 76 continue to be engaged with the inner teeth 85. The inner teeth 85 of the hollow wheel 78, however, continue to be engaged with the outer and radially outer teeth 59 or the planetary gear support 53. The hollow wheel 78 is therefore fixed in a manner which prevents rotation relative to the planetary gear support 73. In addition to this, the planetary gears 76 are mounted in a manner which prevents rotation between the teeth of the sun wheel 78 and the inner teeth 85 of the third hollow wheel 78. Consequently, in this situation the second gearbox step D2 has a speed ration of i=1 between an input side and an output side and therefore does not cause either a change in speed or a change in torque.

The gearbox output 42 is provided on the planetary gear support 79. The planetary gear support 79 has support projections 86 which protrude from the carrier body 80, between which for example the tool shaft 28 can be arranged or by which the tool shaft 28 can be held. For example the tool shaft 28 is held by support elements 87 which in turn are supported on the support projections 86.

The gearbox drive 41, which can also be called a drive shaft, is rotatably mounted on a pivot bearing 88, in particular on a roller bearing, in the embodiments shown in FIGS. 12 to 14. The pivot bearing 88 is supported on an inner circumference of an opening of the support body 67 and is for example axially secured relative to the rotational axis D by means of a snap ring 89.

In the bearing concept shown in FIG. 15, however, the support body 67 is rotatably mounted on the cover or the front wall 46 of the gearbox housing 44 by means of a pivot bearing 90. The pivot bearing 90, for example a ball bearing, needle bearing or other roller bearing (a slide bearing is also possible) is for example arranged and supported in the opening 48.

An actuating device 100 is used to switch and actuate the gearbox 40. The hollow wheel 78 can be adjusted in a linear manner between the setting positions P3, P4 using the actuating device 100. The hollow wheel 78 forms a first switching gear element 101. The hollow wheel 62 can also be adjusted in a linear manner between the setting positions P1 and P2 using the actuating device 100 and is coupled to the actuating device 100 in order to do this. The hollow wheel 62 forms a second switching gear element 102.

A third switching gear element 103 is not switched directly by the actuating device 100 but instead by the switching gear element 102 in between. The switching gear element 103 is provided by the hollow wheel 78.

The planetary gear set 60 forms a components of a first and a second gear wheel arrangement 104, 105, see FIG. 14. The first gear wheel arrangement 104 is assigned to the first switching gear element 102 and comprises for example the roller circumferences 64 of the planetary gears 52. The second gear wheel arrangement 105 is as it were coupled or connected tightly to the first gear wheel arrangement at least in terms of the planetary gears 52. Each planetary gear 52 has various roller circumferences 63, 64 and therefore forms two partial planetary gears. The partial planetary gear with the roller circumference 63 is assigned to the hollow wheel 61 and therefore to the switching gear element 103 and the gear wheel arrangement 105 as a gear wheel 105A. The partial planetary gear with the roller circumference 64 is assigned to the hollow wheel 62 and therefore to the switching gear element 102 and the gear wheel arrangement 104 as a gear wheel 104A. The partial planetary gears are in one piece or coupled tightly to one another as a result of their design as stepped planetary gears. It is easy to imagine, however, that the partial planetary gears can also be individual planetary gears that are connected to one another in a manner which prevents rotation or are rotatable relative to one another in a different embodiment.

The switching gear element 102 acts on the one hand as an active switching element relative to the gear wheel arrangement 104 by being directly engaged with the larger roller circumferences 64 of the planetary gears 52 in the setting position P2. In the setting position P1, however, the hollow wheel 62 is adjusted away from the planetary gears 52, in other words the inner teeth 73 no longer mesh with the roller circumferences 64.

In the setting position P1, however, the hollow wheel 62 is a switch actuator for the other hollow wheel 61 which is held in a manner which prevents rotation by the hollow wheel 62 or the switching gear element 102 relative to the gearbox housing 44 which forms a gearbox holding structure 44A by means of the interlocking teeth, namely the outer teeth 74 and therefore an anti-rotation contour 93 and the inner teeth 73 and therefore a positive-locking counter-contour 94. Consequently, the switching gear element 103 is as it were switched by the switching gear element 102.

At this point it should be noted that teeth are not absolutely essential between the switching gear elements 102, 103 or the hollow wheels 61, 62. For example the switching gear element 102 can only adjust the switching gear element 103 in the direction of a positive-locking counter-contour that is fixed in the housing or locally fixed, in particular on the front wall, such that an anti-rotation contour 92 of the switching gear element 103 with the positive-locking counter-contour 91 can be adjusted into a hold that prevents the switching gear element 103 from rotating relative to the gearbox holding structure, in other words the gearbox housing 44 (FIG. 13). The anti-rotation contour 92 is for example a positive-locking projection that runs in parallel to the setting axis SA; the positive-locking counter-contour 91 is a corresponding positive-locking recess, for example a blind hole. Teeth as anti-rotation contours and positive-locking counter-contours are, however, advantageous.

No direct coupling between the actuating device 100 and in particular the actuating part 110 of this and the switching gear element 103 therefore needs to be provided to switch the gear wheel arrangement. The structure of the actuating device is therefore simpler. The gearbox 40 is built shorter. The actuating device 100 is also simpler and more comfortable to handle, as will become clearer below.

The actuating device 100 comprises the actuating part 110 with an actuating handle 111. The actuating handle 111 is an opening 33 arranged on an upper side wall 34 of the housing 11 of the manual machine tool 10 and therefore easily accessible for a user.

Numbers 1, 2, 3 and 4 or other markings 35 can be arranged on the housing 11, for example on the edge areas of the opening 33, which markings are assigned to the respective switch positions S1, S2, S3 and S4. The actuating handle 111 can be displaced and/or pivoted within the opening 33. The actuating handle 111 can be adjusted into the region of a respective marking 35, in this case therefore into a corner region of the opening 33 to set the switch positions S1, S2, S3 and S4. Direct switching or setting of the actuating handle 111 from each of the switch positions S1, S2, S3 and S4 into each of the other switch positions S1, S2, S3 and S4 without setting an intermediate switch position is possible. The gearbox 40 can for example be adjusted directly from the switch position S1 (actuating handle 111 is shown as a dashed line in FIG. 7) into the switch position S4 (actuating handle 111 is shown as a solid line in FIG. 7) without stopping at the intermediate switch positions S2 or S3.

The actuating handle 110 is provided on an upper side 114 of an in particular barrel-shaped or curved wall body 112, the lower side 113 of which faces towards the gearbox housing 44. A curvature of the wall body 112 corresponds approximately to a curvature of the circumference wall 45 of the gearbox housing 44 such that the wall body 112 can be moved along the circumference wall 45 in the manner of a cover or a cover part or wall section.

The actuating part 110 is arranged on a traction tine 120, which in turn is pivotably mounted on the gearbox housing 44 in a pivotable or rotatable manner, in particular on the outer circumference of the circumference wall 45 about a pivot axis MA which preferably concurs with the rotational axis D of the gearbox output 42. This means the actuating part 110 can pivot about the pivot axis MA and therefore an actuating pivot axis BS between actuating positions D1 and D2.

The carrier ring 120 has a ring body 121 which is rotatably mounted in a ring guide 145 of the gearbox housing 44. The narrow sides of the ring body 121 are for example guided by circumference projections 146 which protrude from the circumference wall 45.

A linear guide 123 for the actuating part 110 is provided in the free longitudinal end areas 122 of the carrier ring 120 such that this is rotatably mounted on the carrier ring 120 along an actuating longitudinal axis BL between actuating positions L1 and L2.

The linear guide 123 comprises linear guide sections 124 arranged directly on the longitudinal end areas 122, which longitudinal guide sections are arranged at an angular distance from one another corresponding to the angular distance between the longitudinal end areas 122. Consequently the actuating part 110 is as it were a connecting link or a binding link which connects the longitudinal end areas 122 of the carrier ring 120 to one another.

Linear guide projections 115 are provided on the lower side 113 of the actuating part 110, which linear guide projections engage in the linear guide sections.

The longitudinal end areas 122 of the carrier ring 120 already have a width or a length corresponding to the actuating longitudinal axis BL such that they are in principle sufficient for the linear guidance of the actuating part 110. Furthermore, the actuating part 110 can be guided into guide recesses, for example grooves, on the outer circumference, for example longitudinal sides and/or transverse sides, or the slot or opening 33 of the upper side wall 34.

There is additional and improved support, however, in the form of support projections 129 which protrude in front of the longitudinal end areas 122 of the carrier ring 120 relative to the actuating longitudinal axis BL or the rotational axis. Further linear guide sections 125 are provided on the support projections 122 in which the linear guide projections 115 engage and by means of which the linear guide projections 115 are guided relative to the actuating longitudinal axis BL. The linear guide sections 124, 125 are for example longitudinal grooves, the transverse width of which roughly corresponds to a transverse width of the linear guide projections 115 relative to the actuating longitudinal axis BL.

An embodiment could provide for guide cams to be provided on the longitudinal end areas 122 of the carrier ring 120 in the manner of the guide cams 133 described below in greater detail, with which a first coupling element 140 which in turn is connected to the switching gear element 101 and therefore the hollow wheel 78 can be driven.

The guide cams 133 are, however, provided on a transmission part 130, which in turn can be rotated relative to the actuating pivot axis BS or a rotational axis of the carrier ring 120. The transmission part 130 has a ring body 131, on the longitudinal end areas 132 of which the guide cams 133 are provided. The longitudinal end areas 132 are for example designed in the manner of plate bodies. A ring slot 137 is provided between the longitudinal end areas on the ring body 131, in other words an intermediate space between ring sections 138 which extend between the longitudinal end areas 132.

The transmission part 130 is arranged in an inner space of the carrier ring 120. A carrier 136 protrudes from a radial outer circumference of the ring body 132, which carrier is coupled to a carrier 126 of the carrier ring 120 in a manner which permits movement. Fixed coupling would also be possible here. The carrier 126 is, however, displaceably or rotatably mounted on the carrier ring 120. The carrier 127 is movably mounted in a cam 127 of the carrier ring 120. The cam 127 extends on the carrier ring in a ring-like manner. It is provided on the ring body 121. The carrier protrudes in a radial direction inwards in front of the ring body such that it can engage with the carrier 136. A plug connection between the carriers 126, 127 [sic—136] is provided, for example. The cam 127 is therefore arch-shaped or ring-shaped and extends about the pivot axis MA of the carrier ring 120 in order to pivot the carrier ring 120 relative to the gearbox housing 44.

The carrier is spring-loaded by means of a spring arrangement 128, for example a coil spring. If the carrier ring 120 is pivoted about the pivot axis MA, the carrier 126 is also moved such that supported by the spring arrangement 128 this rotational movement or rotational force is applied to the transmission part 130 which ultimately converts the rotational movement into a linear movement for the coupling element 140 and the switching gear element 101.

The coupling element 140 is for example formed by a spring bow 141. Longitudinal ends 142 of the coupling element 140 protrude in front of a ring section of the coupling element 140 in a radial direction and engage in the guide cams 133 in the manner of cam followers. The guide cams 133 are for example angular cams. A coupling part recess 143, for example a ring groove, is provided on the switching gear element 101 in the radial direction, in which coupling part recess the coupling element 140 engages, in particular with the ring section 144. A certain spring property also brings the elastic longitudinal ends 142 of the coupling element 140 with it such that ultimately the spring arrangement 128 would not be necessary.

An indentation 147 can be provided on the ring guide 145 in which the ring body 131 and consequently the transmission part 130 engage for the longitudinal end areas 132 of the transmission part 130, resulting in a certain locking effect.

The longitudinal ends 142 of the coupling element 140 which is arranged inside the gearbox housing 144 protrude through slots or longitudinal grooves in front of the circumference wall 45 and engage in the guide cams 133. If, therefore, the actuating part pivots about the actuating pivot axis BS, the carrier ring 120 also pivots about the pivot axis MA at the same time, wherein this pivot movement is deflected by a deflection gear 135 which among other things comprises the guide cams 133 and the coupling element 140 and in particular its longitudinal ends 142 into a linear setting movement for the setting element 101 between setting positions P3 and P4.

Unlike in the embodiment, in principle the transfer of the linear movement of the transmission part 110 relative to the actuating longitudinal axis BL could be transferred directly into a linear actuating movement of a second coupling element 150 which is arranged between the actuating part 110 and the switching gear element 102. In this case, however, the coupling element 150 is pivotably mounted about a pivot axis S such that a linear adjustment of the actuating part 110 along the actuating longitudinal axis BL in a direction in a linear adjustment of the setting gear element 102 is deflected into an opposite direction.

The coupling element 150 comprises a spring bow 159. The coupling element 150 comprises an actuating section 151 which engages in a guide recess 116 on the lower side 113 of the actuating part 110. Furthermore the actuating section 151 is received in a slot 124A between the linear guide sections 124, 125 of the carrier ring 120.

The spring bow 159 or the coupling element 140 is pivotably mounted on the gearbox housing 44 about the pivot axis S. The pivot axis S is between the actuating section 151 and the carrier projections 154 on the free end areas of the coupling element 150. Bearing recesses 157 are formed on the coupling element 150 between the carrier projections 153 in which the bearing pins 156 which protrude in a radial outer direction in front of the gearbox housing 44 or the circumference wall 45 engage. The bearing recesses 157 can be found between the actuating sections 152 and the carrier sections 153 of the coupling element 150. The actuating sections 152, 153 are as it were levers which stick out from the pivot axis S.

The carrier projections 154 which are for example thin wire ends engage in carrier indentations 155 of the switching gear element 102, and consequently therefore the hollow wheel 62. For example, holes or as in the embodiment grooves are provided as carrier indentations 155.

The second coupling element 150 extends in an arch shape about the switching gear element 102 but is only in contact with the switching gear element 102 in the region of the carrier recesses 154. In contrast to this, the coupling element 140 is ring-shaped as a result of its ring section 144 and engaged with the switching gear element 101 over a larger length.

In contrast to the coupling element 140, the coupling element 150 is arranged outside of the gearbox housing 44. Its carrier projections 154 stretch in an inner radial direction relative to the actuating pivot axis BS or the pivot axis MA in front of the carrier sections 153 and penetrate slots 158 on the gearbox housing 44 or circumference wall 45 such that they are engaged with the carrier indentations 155 of the hollow wheel 62 or the switching gear element 102.

The actuating device 100 can also be locked by means of a locking arrangement 160. The locking arrangement 160 comprises a locking part 161 which can engage in locking indentations 164 on the actuating part 110, for example on the lower side 113 of the wall body 112. The locking part 161 is spring-loaded by a spring 162 into its locking positive which engages in the locking indentations 164. The spring 162 and preferably the locking part 161 are received and/or guided in a recess or on a recess 163 of the gearbox housing, for example a cylindrical recess. Each locking indentation 164 is assigned to one of the switch positions S1, S2, S3 and S4 of the gearbox 40.

The operator can move the actuating part 110 into the actuating positions assigned to the respective switch positions relative to the actuating longitudinal axis BL and the actuating pivot axis BS, in which locking is expediently possible. The actuating part 110 can for example be locked and/or positioned in the actuating positions L1, D1 to set the switch position 1; in actuating positions L2, D2 to set switch position S2; in actuating positions L1, D2 to set the switch position S3 and finally in actuating positions D2, L2 to set the switch position S4.

The carrier ring 120 follows the movement of the actuating part 110 about the actuating pivot axis BS. The spring arrangement 128 thereby uncouples the actuating movement from the actual setting movement.

A spring system is also provided in connection with the coupling element 150. For example, the carrier sections 153 can spring or bend in an elastic manner relative to the actuating sections 151 and/or 152. This is achieved on the one hand by the design of the coupling element 150 as a spring bow 159. It is also, however, facilitated or improved by the fact that the bearing recess 157 is formed by a turning of the spring bow 159 such that the carrier sections 153 are elastic relative to the carrier actuating sections 152 relative to the pivot axis S.

FIG. 15 indicates that the switching gear element 102 can in principle also be used to couple the gear wheel arrangements 104 and 105 to one another in a manner which prevents them from rotating. For example, the switching gear element 102 in a setting position P2B is simultaneously engaged in both gear wheel arrangements 104 and 105 in a manner which prevents rotation and can rotate within the gearbox holding structure 44A or the gearbox housing 44. The switching gear element 102 which forms the switch actuator is therefore simultaneously engaged with both gear wheel arrangements 104 and 105. A ring groove or another slot of the like can for example be provided in the gearbox housing to ensure rotational freedom of the switching gear element 102.

The spring bow 159 or the coupling element 150 is pivotably mounted on the gearbox housing 44 about the pivot axis S such that a respective slide actuation of the actuating part 110 in a first direction is deflected into an opposite linear movement of the switching gear element 102. It would be possible, however for the coupling element 150 for example to be coupled to the actuating part 110 in a fixed manner such that the above-mentioned reversal of movement does not occur or in other words the movement directions of the actuating part 110, the coupling element 150 and the switching gear element 102 run in parallel.

It is possible for the same gear gradations to be possible in the same setting positions of the actuating part 110 as in the case of the configuration described above, if the gearbox 40 is for example modified as follows and as indicated schematically in FIG. 14. In this configuration, for example, the planetary gears 52 are arranged on the planetary gear supports 53 such that the smaller roller circumference 63 is closer to the carrier body 54 than the larger roller circumference 64. This is indicated with a planetary gear 52B which is as it were rotated about 180° as the planetary gear 52 is arranged on the planetary gear support 53. If the radial inner hollow wheel which meshes with the smaller roller circumference is arranged closer to the carrier body 54 (which is indicated with a hollow wheel 61B in FIG. 14), the gear translations which can be set by means of the linear adjustment of the hollow wheel 62 between the setting positions P1 and P2 are precisely the reverse of those in the embodiment described above.

10 Manual machine tool
11 Machine housing
12 Handle section
13 Motor section
14 Energy storage interface
15 Power supply device
16 Switch
17 Drive motor
18 Motor shaft
19 Motor bearing
20 Exciter coil arrangement
21 Rear wall
22 Front face
23 Upper side wall
24 Rotation direction alternator
25 Energy storage device
26 Hook element
27 Motor output
28 Tool shaft
29 Tool recess
30 Tool
31 Bearing
32 Recess chuck
33 Opening for 110
34 Upper side wall
35 Markings
40 Gear
41 Gearbox drive drive wheel
42 Gearbox output
43 Bearing for tool shaft 28
44 Gearbox housing
44A Gearbox holding structure
45 Circumference wall
46 Front wall to 17
47 Front wall to 29
48 Openings of 46, 47
49 Teeth
50 Circumference contour on 46
51 Sun wheel
52 Planetary gears
53 Planetary gear support/bar
54 Carrier body
55 Axis element
56 Roller bearing
57 Output
58 Sun wheel
59 Teeth F116
60 Planetary gear set
61 1st hollow wheel
62 2nd hollow wheel
63 Roller circumference on 52 for 61
64 Roller circumference on 52 for 62
65 Step between 63 and 64
66 Bearing plate
67 Support body
68 Recesses for axis elements 55
69 Support projections
70 Anti-rotation projection
71 Anti-rotation recess
72 Longitudinal groove
73 Inner teeth of 62
74 Outer teeth
75 Inner teeth of 61
76 Planetary gears
77 Planetary gear set
78 3rd hollow wheel
79 Planetary gear support/bar
80 Carrier body
81 Axis element
82 Roller bearing
83 Anti-rotation projections 78
84 Anti-rotation recesses
85 Inner teeth 78
86 Support projections
87 Support element
88 Pivot bearing
89 Snap ring
90 Pivot bearing
91 Positive-locking counter-contour
92 Anti-rotation contour
93 Anti-rotation contour 74
94 Positive-locking counter-contour 73
95
100 Actuating device
101 Switching gear element 78
102 Switching gear element 62
103 Switching gear element 61
104 1. Gear wheel arrangement for 62
105 2. Gear wheel arrangement for 61
110 Actuating part
111 Actuating handle
112 Wall body
113 Lower side
114 Upper side
115 Linear guide projection
116 Guide recess
120 Carrier ring
121 Ring body
122 Longitudinal end areas
123 Linear guide 124A slot
124 Linear guide sections
125 Linear guide sections
126 Carrier
127 Cam
128 Spring arrangement
129 Support projections
130 Transmission part
131 Ring body
132 Longitudinal end areas
133 Guide cam
134
135 Deflecting gearbox
136 Carrier
137 Ring slot 138 Ring sections
140 1. Coupling element
141 Spring bow
142 Longitudinal end
143 Coupling part recess
144 Ring sections
145 Ring guide
146 Circumference projection
147 Indentation
148 Slot/groove for 142
150 2nd coupling element
151 Actuating section on 110
152 Actuating section
153 Carrier section
154 Carrier projection
155 Carrier indentation
156 Bearing pin
157 Bearing recess
158 Slot/groove for 154
159 Spring bow
160 Locking arrangement
161 Locking part
162 Spring
163 Recess
164 Locking indentations on 110
165
166
167
168
169
P1 P2, P3 P4 Setting positions
G1 1. Gear step
G2 2. Gear step
S1 1st setting position (S1, S2, S3, S4)
S2 2nd setting position
S3 3rd setting position
S4 4th setting position
SA Setting axis
AB Setting axis
D Rotational axis of 40
BS Actuating pivot axis
BL Actuating longitudinal axis

The invention claimed is:

1. A manual machine tool having a drive motor, a gearbox arranged on a gearbox holding structure and a tool holder, wherein a motor output of the drive motor with a gearbox drive of the gearbox and a gearbox output of the gearbox which can be rotated about a rotational axis are coupled to the tool holder in a manner which permits rotation, wherein the gearbox can be switched between at least two switch positions in which the speed ratios between the gearbox drive and the gearbox output are different to one another, wherein the gearbox comprises a first gear wheel arrangement and at least a second gear wheel arrangement, each of which has at least one gear wheel and a switching gear element, wherein the two gear wheel arrangements can roll the at least one gear wheel on the switching gear element of the gear wheel arrangement, and wherein one switching gear element is mounted in a locally adjustable manner between at least two setting positions in order to adjust the switch positions of the gearbox on the gearbox holding structure and the other switching gear element is adjustable between an immobile position and a mobile position relative to the gearbox holding structure, and wherein, in order to switch the gearbox between at least two of the switch positions, the switching gear element of the first gear wheel arrangement forms a switch actuator for the second gear wheel arrangement which can be switched between a first setting position and at least a second setting position, and wherein the switching gear element of the second gear wheel arrangement is tightly fixed in the first setting position of the switch actuator relative to the gearbox holding structure and to be rotatable in the second setting position relative to the gearbox holding structure.

2. The manual machine tool according to claim 1, wherein the switching gear element of the second gear wheel arrangement has at least one anti-rotation contour to engage in a positive-locking counter-contour of the gearbox holding structure and/or the switching gear element which forms the switch actuator for the fixed regulation of the gearbox holding structure.

3. The manual machine tool according to claim 2, wherein the anti-rotation contour is arranged on a radial outer circumference and/or a front face of the switching gear element which can be switched by the switch actuator.

4. The manual machine tool according to claim 2 wherein the switching gear element which forms the switch actuator has arch-shaped teeth on its inner circumference as a positive-locking counter-contour by means of which teeth in the first setting position the anti-rotation contour of the switching gear element which can be switched by the switch actuator is engaged and in the second setting position the at least one gear wheel of the first gear wheel arrangement is engaged.

5. The manual machine tool according to claim 1, wherein the switching gear element which forms the switch actuator is disengaged from the at least one gear wheel of the first gear wheel arrangement in the first setting position.

6. The manual machine tool according to claim 1, wherein, in the second setting position of the switching gear element which forms the switch actuator, the switching gear element of the at least one second gear wheel arrangement can be rotated relative to the gearbox holding structure and can be carried along by means of the at least one gear wheel of the at least one second gear wheel arrangement.

7. The manual machine tool according to claim 1, wherein the switching gear element of the second gear wheel arrangement can only be switched by means of the switching gear element which forms the switch actuator.

8. The manual machine tool according to claim 1, wherein the switching gear element which can be switched by the switch actuator of the second gear wheel arrangement is rotatably mounted and/or cannot be displaced in a linear direction relative to the gearbox holding structure.

9. The manual machine tool according to claim 1, wherein the switching gear element which forms the switch actuator is displaceably mounted in a linear manner relative to the gearbox holding structure and is parallel to a rotational axis of the gearbox drive and/or the gearbox output or its own rotational axis, between the first setting position and the second setting position.

10. The manual machine tool according to claim 1, wherein the switching gear element which forms the switch actuator is fixed to prevent rotation in at least one setting position or all setting positions relative to the gearbox holding structure.

11. The manual machine tool according to claim 1, wherein at least one of the switching gear elements is a hollow wheel.

12. The manual machine tool according to claim 1, wherein the switching gear elements engage in one another in at least one of the setting positions of the switching gear element which forms the switch actuator.

13. The manual machine tool according to claim 1, wherein the gear wheels of the first gear wheel arrangement which are or can be in rolling engagement and the at least one second gear wheel arrangement are different from one another in terms of their diameter and/or they have different roller circumferences from one another in terms of their diameter for the rolling engagement with the respective assigned switching gear element.

14. The manual machine tool according to claim 1, wherein the gear wheel of the first gear wheel arrangement that are or can be in rolling engagement with the switching gear elements and the at least one second gear wheel arrangement are formed by at least one stepped planetary gear or have at least one stepped planetary gear.

15. The manual machine tool according to claim 1, wherein the gear wheel of the first gear wheel arrangement that are or can be in rolling engagement with the switching gear elements and the at least one second gear wheel arrangement are connected to one another in a manner which prevents rotation.

16. The manual machine tool according to claim 1, wherein a radial outer circumference of the switching gear element of the second gear wheel arrangement aligns with the radial outer circumference of the at least one gear wheel of the first gear wheel arrangement such that the switching gear element which forms the switch actuator can be adjusted between the outer circumferences of the switching gear element of the second gear wheel arrangement and the at least one gear wheel of the first gear wheel arrangement in parallel to a rotational axis of the gear wheel.

17. The manual machine tool according to claim 1, wherein the gear wheel of the first gear wheel arrangement that are or can be in rolling engagement with the switching gear elements and the at least one second gear wheel arrangement are connected to one another in a manner which prevents rotation and/or are in one piece and/or form stepped planetary gears and/or are arranged on a common planetary gear support or bar.

18. The manual machine tool according to claim 1, wherein the gearbox drive is connected to a sun wheel in a manner which prevents rotation or coupled in manner which permits rotation, which sun wheel is in rolling engagement with the at least one gear wheel of the first and/or the second gear wheel arrangement.

19. The manual machine tool according to claim 1, wherein the first gear wheel arrangement and the second gear wheel arrangement form a first gear step and the gearbox has at least a second gear step, which is upstream or downstream of the first gear step relative to the gearbox output.

20. The manual machine tool according to claim 19, wherein the second gearbox step can be switched between at least two switch positions in which a speed ratio between a drive of the first gearbox step and an output of the second gearbox step is different.

21. The manual machine tool according to claim 1, wherein the switching gear element of the first gear wheel arrangement and/or the switching gear element of the second gear wheel arrangement form or have a hollow wheel.

22. The manual machine tool according to claim 1, wherein a radial outer circumference of the switching gear element of the second gear wheel arrangement and a radial outer circumference of the at least one gear wheel of the first gear wheel arrangement align with one another such that the switching gear element of the first gear wheel arrangement can be brought into meshing engagement, with the radial outer circumference of the at least one gear wheel of the first gear wheel arrangement or the switching gear element of the second gear arrangement.

23. The manual machine tool according to claim 1, wherein the switching gear element of the first gear wheel arrangement engages either with the switching gear element of the second gear wheel arrangement or the at least one gear wheel of the first gear wheel arrangement in its switch positions.

24. The manual machine tool according to claim 1, wherein the gearbox has a first switching gear element and a second switching gear element, one of which is the switch actuator and the other switching gear element is another switching gear element separate from the switched switching gear element of the second gear arrangement, wherein the first switching gear element and the second switching gear element can be adjusted in a linear manner by means of an actuating device in each case between a first setting position and a second setting position relative to the gearbox holding structure designed as a gearbox housing, wherein the actuating device is coupled to the switching gear elements and has an actuating part which is pivotably mounted relative to a machine housing of the manual machine tool about an actuating pivot axis and can be actuated manually by an operator of the manual machine tool, wherein the first switching gear element can be adjusted in a linear manner along its setting axis by means of a pivot movement of the actuating part about the actuating pivot axis using a deflecting gear, wherein the deflecting gear comprises a carrier ring which extends in a ring-shaped manner around the gearbox housing and is rotatably mounted about the actuating pivot axis, which carrier ring is coupled to the first switching gear element to enable the linear adjustment of this by means of a first coupling element, and wherein the actuating part is mounted on the carrier ring along an actuating longitudinal axis in a manner which permits displacement in a linear manner and which is coupled to the at least one second switching gear element by means of a second coupling element to enable the linear displacement of the second switching gear element.

25. A manual machine tool having a drive motor, a gearbox arranged on a gearbox holding structure and a tool holder, wherein a motor output of the drive motor with a gearbox drive of the gearbox and a gearbox output of the gearbox which can be rotated about a rotational axis are coupled to the tool holder in a manner which permits rotation, wherein the gearbox can be switched between at least two switch positions in which the speed ratios between the gearbox drive and the gearbox output are different to one another, wherein the gearbox comprises a first gear wheel arrangement and at least a second gear wheel arrangement, each of which has at least one gear wheel and a switching gear element, wherein the two gear wheel arrangements can roll the at least one gear wheel on the switching gear element of the gear wheel arrangement, and wherein one switching gear element is mounted in a locally adjustable manner between at least two setting positions in order to adjust the switch positions of the gearbox on the gearbox holding structure and the other switching gear element is adjustable between an immobile position and a mobile position relative to the gearbox holding structure, and wherein, in order to switch the gearbox between at least two of the switch positions, the switching gear element of the first gear wheel arrangement forms a switch actuator for the second gear wheel arrangement which can be switched between a first setting position and at least a second setting position, wherein a movement of the switching gear element of the second gear wheel arrangement relative to the gearbox holding structure in the first setting position is different from a movement of the switching gear element of the second gear wheel arrangement relative to the gearbox holding structure in the second setting position, and wherein the at least one gear wheel of at least one of the gear wheel arrangement forms part of a planetary gear set.

26. A manual machine tool having a drive motor, a gearbox arranged on a gearbox holding structure and a tool holder, wherein a motor output of the drive motor with a gearbox drive of the gearbox and a gearbox output of the gearbox which can be rotated about a rotational axis are coupled to the tool holder in a manner which permits rotation, wherein the gearbox can be switched between at least two switch positions in which the speed ratios between the gearbox drive and the gearbox output are different to one another, wherein the gearbox comprises a first gear wheel arrangement and at least a second gear wheel arrangement, each of which has at least one gear wheel and a switching gear element, wherein the two gear wheel arrangements can roll the at least one gear wheel on the switching gear element of the gear wheel arrangement, and wherein one switching gear element is mounted in a locally adjustable manner between at least two setting positions in order to adjust the switch positions of the gearbox on the gearbox holding structure and the other switching gear element is adjustable between an immobile position and a mobile position relative to the gearbox holding structure, and wherein, in order to switch the gearbox between at least two of the switch positions, the switching gear element of the first gear wheel arrangement forms a switch actuator for the second gear wheel arrangement which can be switched between a first setting position and at least a second setting position, wherein a movement of the switching gear element of the second gear wheel arrangement relative to the gearbox holding structure in the first setting position is different from a movement of the switching gear element of the second gear wheel arrangement relative to the gearbox holding structure in the second setting position, and wherein the switching gear element which forms the switch actuator is arranged in a radial outer direction and the switching gear element which can be switched by the switch actuator is arranged in a radial inner direction relative to the rotational axis of the gearbox output.

* * * * *